United States Patent [19]
Land

[11] Patent Number: 6,067,391
[45] Date of Patent: May 23, 2000

[54] MULTIPLY PERIODIC REFRACTIVE INDEX MODULATED OPTICAL FILTERS

[75] Inventor: Peter L. Land, Dayton, Ohio

[73] Assignee: The United States of America as represented by the Secretary of the Air Force, Washington, D.C.

[21] Appl. No.: 09/145,111

[22] Filed: Sep. 2, 1998

[51] Int. Cl.[7] ....................................................... G02B 6/34
[52] U.S. Cl. .............................................. 385/27; 385/37
[58] Field of Search .................................. 385/27, 37, 15

[56] References Cited

U.S. PATENT DOCUMENTS

| | | | |
|---|---|---|---|
| 5,170,290 | 12/1992 | Land et al. | 359/579 |
| 5,225,930 | 7/1993 | Land et al. | 359/578 |

*Primary Examiner*—John D. Lee
*Assistant Examiner*—Sarah Song
*Attorney, Agent, or Firm*—Bobby D. Scearce; Thomas L. Kundert

[57] ABSTRACT

A high transmission comb-like optical filter structure in wave guiding media is described, an example of which includes multiply periodic modulation of length $L=UL_R$ where U represents an integer number of identical periods of length $L_R$ and $L_R$ is the length of a series of periodically modulated elements of length $s_v=M_v d_v$, $v=1$ to $V$, where $M_v$ is an integer number of cycles of length $d_v$. Individual filter elements of length $s_v$ of a filter of the invention compared to the reflectors bounding a conventional or series coupled Fabry-Perot cavity exhibit moderate to low reflectivity. Modulation of individual filter elements may be step-wise constant, sinusoidal, or other forms of refractive index modulation.

15 Claims, 22 Drawing Sheets

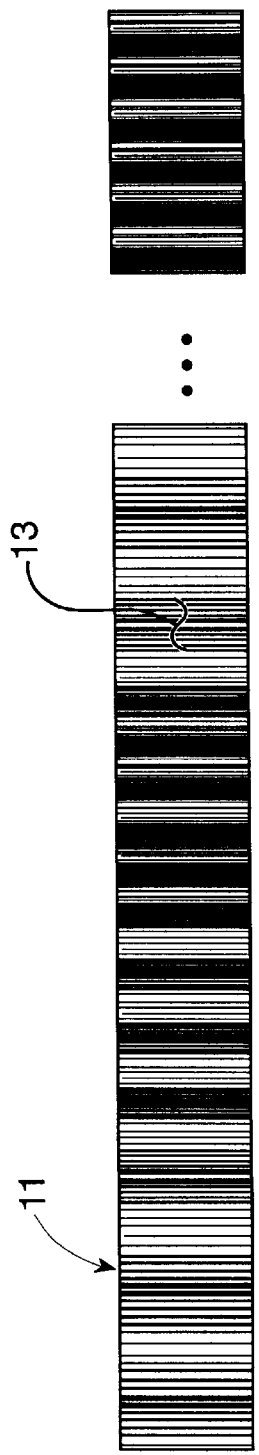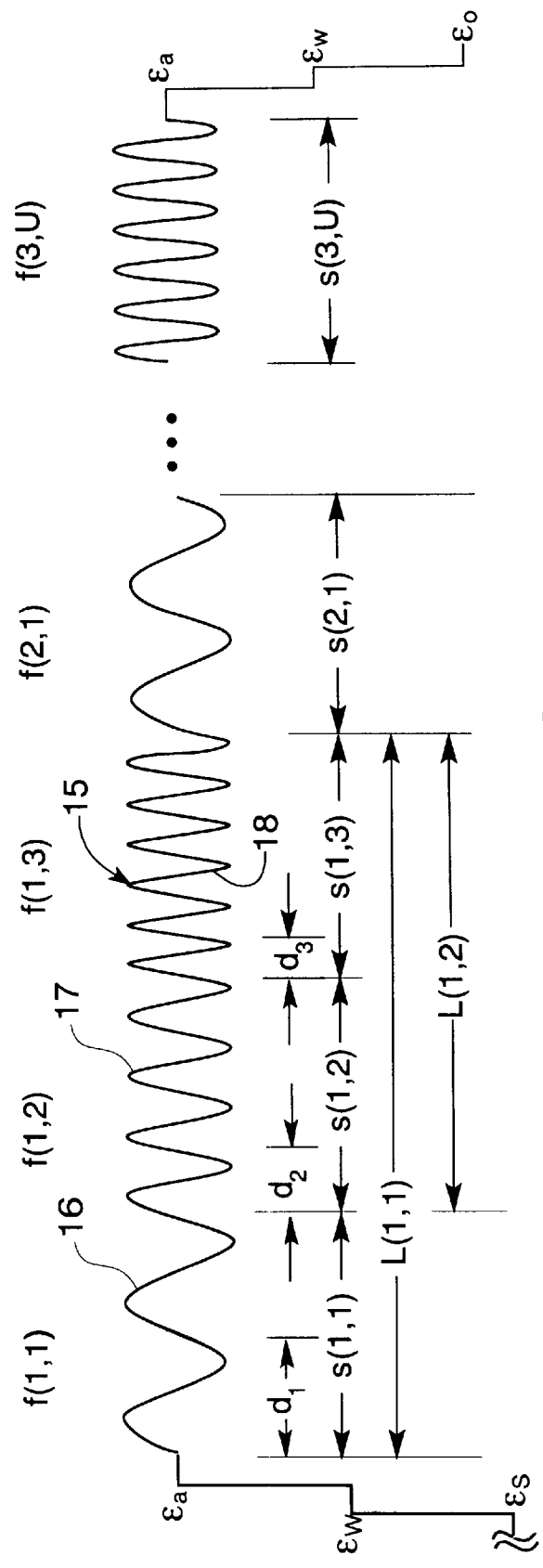

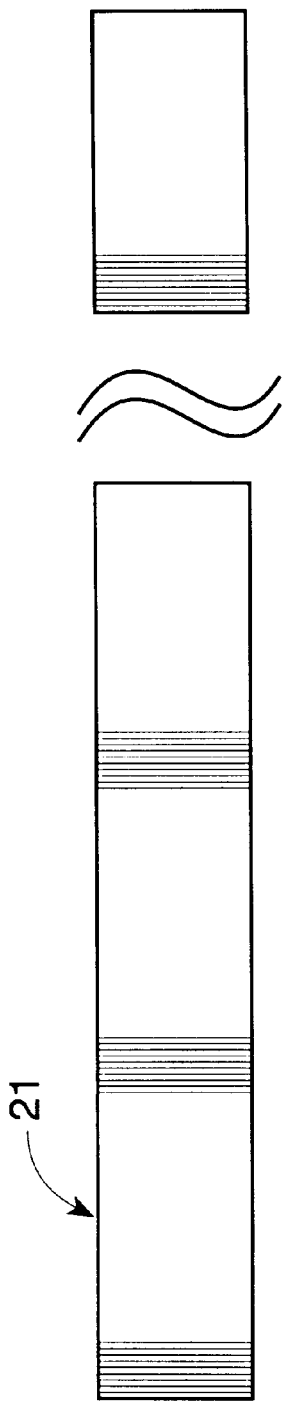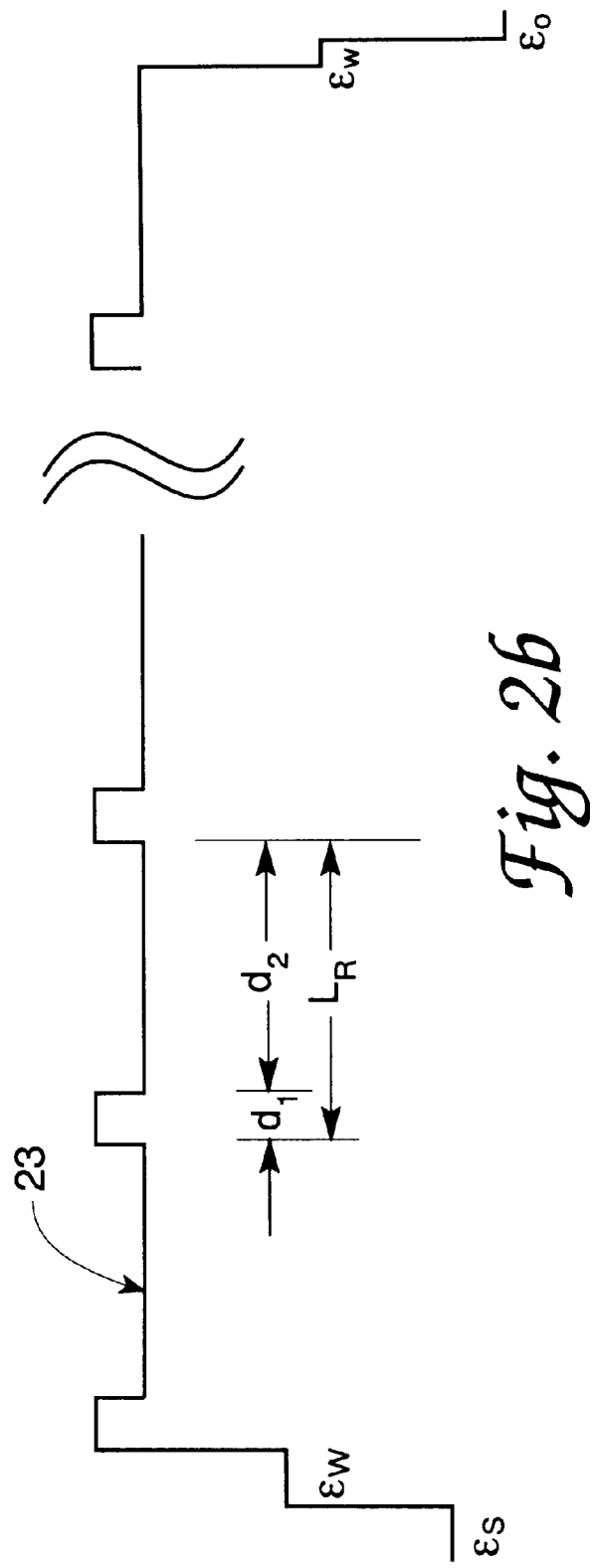

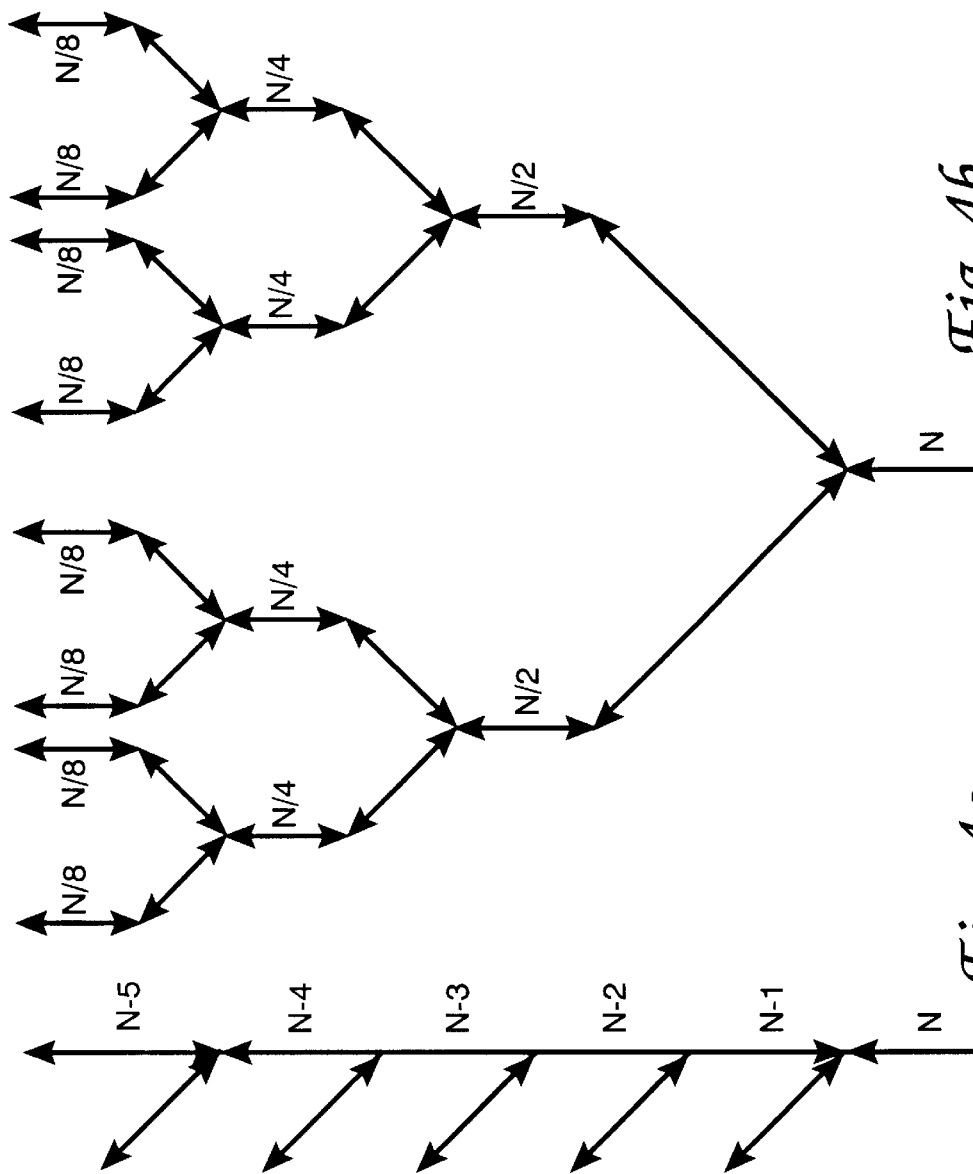

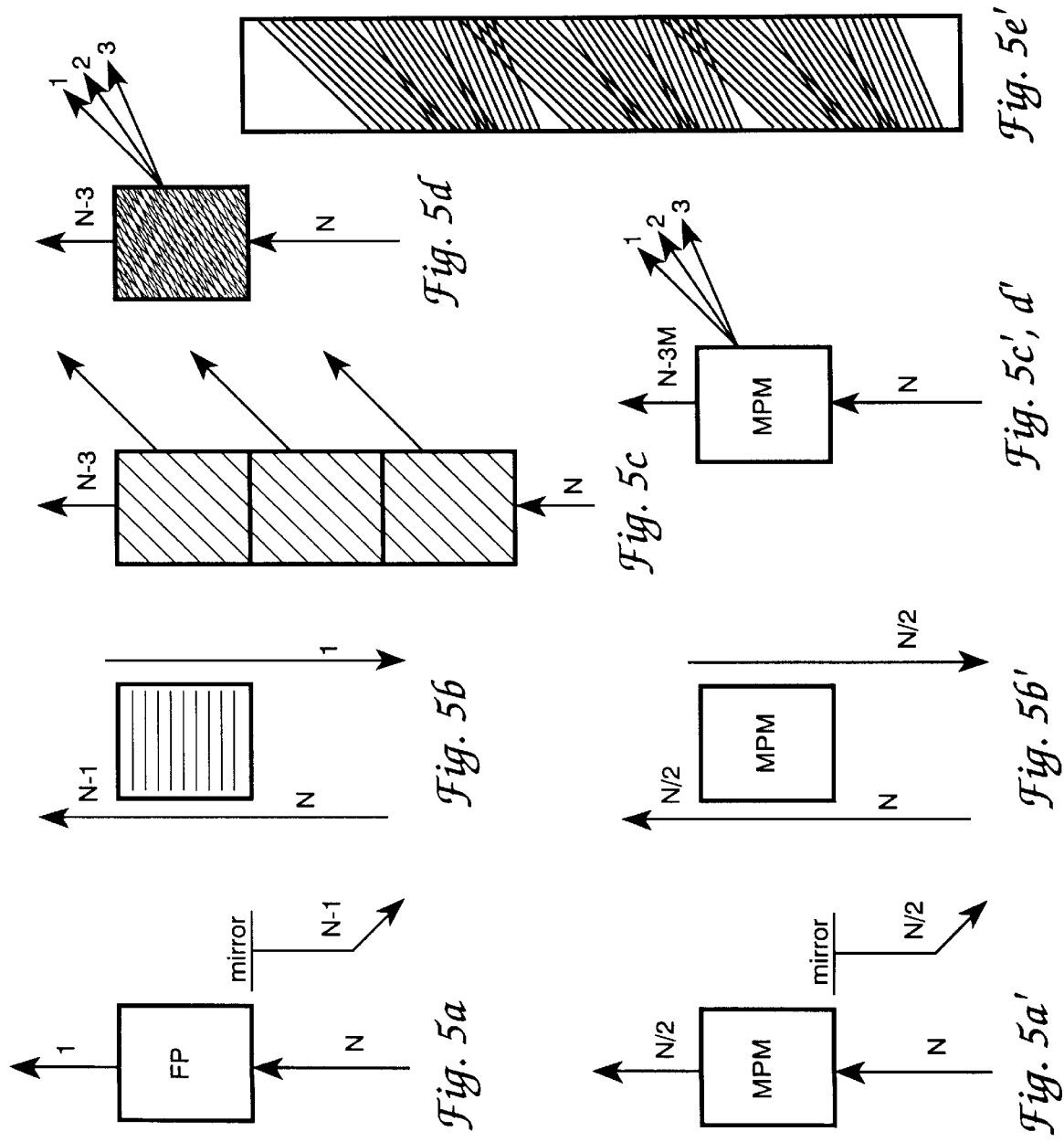

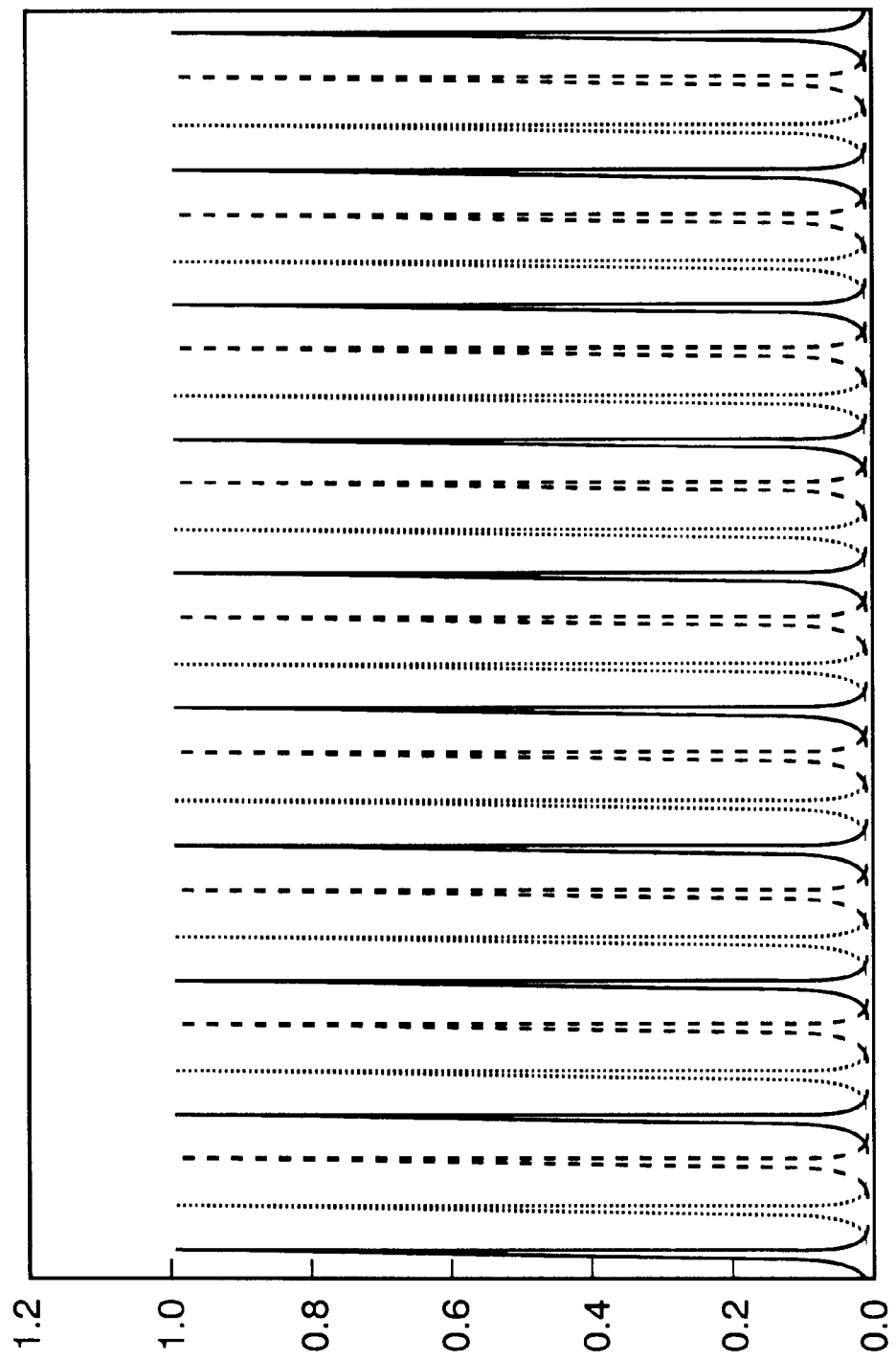

MULTIPLY PERIODIC REFRACTIVE INDEX MODULATED OPTICAL FILTERS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical filters, and more particularly to improved high transmission comb-type optical filters contained in waveguiding media within which or onto which multiply periodic and/or stepwise constant modulation is imposed in order to effect strong reflections at a multiplicity of selected narrow optical bands occurring within a larger selected band.

High transmission comb (HTC) filters are distinguished from Fabry-Perot (F-P) type filters by their design and performance characteristics. To quantify uniqueness, the reflectance of individual filter elements is specified to be less than about 70 percent which is less than one would expect to find for the mirrors of a simple F-P resonant structure or any among a series of optically coupled F-P type resonant structures.

A summary of prior work on HTC filters may be found in Land et al, U.S. Pat. Nos. 5,170,290 and 5,225,930, and "High Transmission Comb-Like Optical Filters," J Optical Society of America A, pp 611–622 (1995). Land et al '290 teaches thin film filters where the modulation is stepwise constant with one step, of length $d_1$ being much shorter than the other $d_2$. This type filter has a periodic length $L_R = d_1 + d_2$ which is substantially longer than the wavelength range to be filtered, so that the filter operates in high order. Land et al '930 teaches multiply periodic modulation (mpm) with form that can be interpreted to include the form of the structure described in the '290 patent.

The coupled mode perturbation theory as taught by Yariv et al, *Optical Waves in Crystals* (John Wiley & Sons, NY (1984)) was extended by Land et al in order to conveniently design and characterize multiply periodic thin film filters. The theory is applicable to waveguides which confine wave propagation within 1 or 2 major dimensions and to unbounded propagation. (The term waveguide applies to any wave guiding structure that limits the region of wave propagation. Mpm of a waveguide may include the core, the relatively high index region, where waves propagate, and any region between or adjacent individual waveguides which support only evanescent waves.)

The invention provides an mpm filter structure having a comb-like reflection spectrum wherein the envelope connecting significant peak reflectances spans an optical band of interest.

The prior art teach HTC filters that control light transmission through index modulated thin films prepared on substrates and are structured so that the modulated length L is small compared to the lateral extent of the film. The HTC filter structure of the invention includes waveguiding media in which the modulated length L is large with respect to at least one waveguide dimension.

Singly periodic modulation comprising short and long segments with a periods substantially longer that the wavelength range of interest also produces a comb spectrum with narrow reflection peaks and moderate to high total transmission, but is not as wavelength selective, nor efficient in providing reflection per unit length in materials having limited modulation amplitude, as mpm.

Mpm provides for cascaded multiplexing/demultiplexing (m/d) of interlaced frequencies, whereas other Bragg type modulation typically provides serial branching of frequencies. Mpm may provide better frequency discrimination than a Mach Zender structure or arrayed waveguide gratings because of the difference in spectral transmission/reflection and branching characteristics. Mpm may be more economically produced, and coherent mpm can be provided in silica optical fiber directly and in other holographic media by crossed ultraviolet beams without subsequent curing.

Mpm may beneficially replace or augment other means for providing feedback to waveguide lasers and may permit tunable or switchable multiline distributed feedback lasers. Mpm be used as novel dielectric mirrors for resonant waveguide cavities. The mirrors might be identical and with proper spacing could allow transmission of a narrow line within some reflection peaks of a set of reflection comb peaks. Another version may have an mpm reflector pair with different free spectral ranges bounding a section of unmodulated waveguide with the mpm filter comb peaks somewhat offset so that by tuning one reflector set, a single resonance supports transmission of a single narrow line. This configuration might be applied to development of switchable and tunable waveguide lasers. A single narrow line can be separated from other transmission by an auxiliary filter.

Typically, thin film filters and waveguides present different advantages and limitations with respect to employing mpm. The thin films provide relatively large optical index modulation, and the average index may be independent of the modulation amplitude. In the case of modulated optical fibers, for example, the variation in index is typically limited to index modulation levels near or below 0.1%, and the average index changes with dose and the modulation characteristic may change with dose. Thin film filter modulation thicknesses are limited because of loss of physical integrity and by slow deposition rates. Coherence may be reduced both laterally and through the thickness. The coherence length of modulation in optical fibers can be much greater, perhaps 1000 times greater than in thin films. Coherent modulation and consistent performance are achieved by controlling waveguide uniformity and ambient temperature and by designing to reduce and/or compensate the effects of thermal expansion and thermally induced index change. However, some applications may utilize a shift in a comb spectrum for control or measurement.

One motivation for using mpm in optical filters is to provide behavior opposite to that of an F-P type filter, that is, a comb-like reflection which contrasts with the comb-like transmission of an F-P filter. Another motivation is to provide alternatives to simple serial or simple parallel Bragg modulation to provide a comb-like reflection and transmission spectrum in cases where a regular comb peak spacing (free spectral range) will serve as well as an arbitrary peak spacing (Othonos et al, "Superimposed multiple Bragg gratings," Electronics Lett 30, No 23, pp 1972–4 (1994)). Although it cannot be arbitrary and cannot be strictly uniform in spacing by wavenumber, the line spectrum of an mpm HTC waveguide filter can be useful.

Mpm may be advantageous relative to serial or parallel Bragg modulation when a large number of narrow spectral lines are desired within a given spectral range, most particularly if the refractive index excursion of a medium to be modulated is limited (Othonos et al, supra, and Chen, "Polymer-based photonic integrated circuits," Optics and Laser Tech, 25(6), pp 347–365 (1993)). This advantage can be understood by comparing the spectrum generated by serial modulation using four Bragg elements in tandem and the spectrum when the four elements are divided into smaller sections having the same modulation amplitude and arranged as an mpm (Land et al, supra). The latter arrangement provides an increased number of reflection peaks with smaller half widths, while providing about the same total transmission and total reflection. However, if the serial modulation is replaced by parallel modulation throughout the filter length with the index modulation amplitude of each component taken as ¼ that of the other arrangements to avoid saturation effects, the number and amplitude of reflection peaks are equal to those of the serial case. However the peak widths for the parallel case will be about the same as the corresponding peaks provided by the mpm. These differences are illustrated partially in FIGS. 6 and 7 of Land et al, JOSA, supra. The differences are rooted in the fact that spectral resolution of a filter generally increases with modulation length and the fact that the total reflection relates to the average modulation amplitude.

It is therefore a principal object of the invention to provide an improved optical filter.

It is another object of the invention to provide an optical filter for improving optical waveguide devices and related systems.

It is another object of the invention to provide a high transmission comb-type optical filter having multiply periodic refractive index modulation.

It is another object of the invention to provide an mpm waveguide.

It is another object of the invention to provide a novel resonant F-P optical cavity structure.

It is a further object of the invention to provide mpm waveguide reflectors which include m/d of optical waves in optical fibers and waveguides, multiline distributed feedback lasers, multiline Raman lasers, fiber and waveguide sensors and sensor systems.

These and other objects of the invention will become apparent as a detailed description of various embodiments thereof proceeds.

SUMMARY OF THE INVENTION

In accordance with the foregoing principles and objects of the invention, an optical filter structure in wave guiding media is described, an example of which includes multiply periodic modulation of length $L=UL_R$ where U represents an integer number of identical periods of length $L_R$ and $L_R$ is the length of a series of periodically modulated elements of length $s_v=M_v d_v$, $v=1$ to V, where $M_v$ is an integer number of cycles of length $d_v$. Individual filter elements of length $s_v$ of a filter of the invention compared to the reflectors bounding a conventional or series coupled Fabry-Perot cavity exhibit moderate to low reflectivity. Modulation of individual filter elements may be step-wise constant, sinusoidal, or other forms of refractive index modulation.

BRIEF DESCRIPTION OF THE DRAWINGS

The invention will be more clearly understood from the following detailed description of representative embodiments thereof read in conjunction with the following drawings wherein:

FIG. 1a illustrates schematically a portion of either a linear or planar waveguide of the invention containing a one-dimensional index modulation consisting of three periodic element types including a transversely uniform multiply periodic index modulation along a waveguide core.

FIG. 1b shows an example of multiply-periodic sinusoidal modulation of the real refractive index versus the length of a portion of waveguide, and includes symbols used to mathematically describe one-dimensionally-multiply-periodic index modulated structures.

FIG. 2a illustrates schematically a portion of either a linear or planar waveguide of the invention employing stepwise-constant index modulation.

FIG. 2b is a plot of real index versus length including symbols describing filter structures.

FIG. 4a shows schematically the serial m/d of optical carrier frequencies to/from a trunk line.

FIG. 4b shows schematically cascaded m/d of optical carrier frequencies among relatively major and minor trunk lines.

FIGS. 5a, a', b, and b' illustrate examples of m/d in waveguides where an F-P or simple Bragg filter is replaced by an mpm comb filter to provide cascaded m/d rather than serial m/d.

FIGS. 5c, d, c',d' and e' illustrate the option of using mpm instead of serial or parallel slanted modulation to achieve angularly dispersive m/d.

FIG. 6b illustrates the frequencies or wavenumbers that would be retroreflected, exchanged, or transmitted by adjacent waveguides when a region between or adjacent to the waveguides contains mpm. This contradirectional exchange case is illustrated in FIG. 5b'.

DETAILED DESCRIPTION OF PREFERRED EMBODIMENTS

Figure 3A:
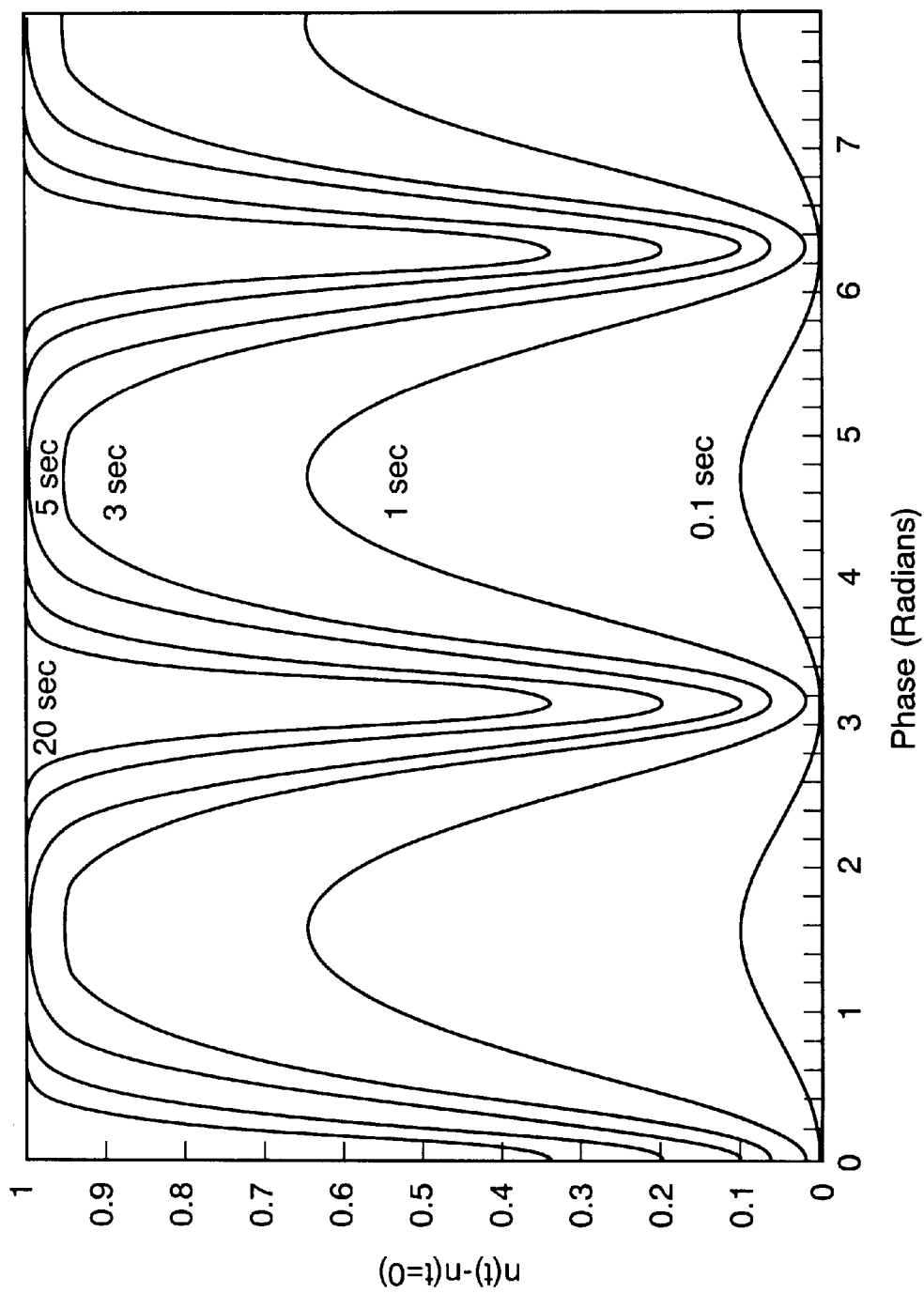
FIGS. 3a and 3b show the index modulation amplitude imposed by two intersecting laser beams of equal intensity, which cross a waveguide core at incident angles $\theta'$ and $-\theta'$ and by uniform background light. This situation is represented by an equation where the filter refractive index varies as $n-n_o=1-\exp[-(a \sin^2\phi+b)t/\tau]$. A family of curves corresponding to different exposure times t illustrates the evolution of the modulation with exposure time, where $\tau=1$ see, $a=1$, with $b=0.02$ (FIG. 3a) and with $b=0.5$ (FIG. 3b); here $\phi$ is the phase of the counterpropagating wave components that write the desired modulation. Nonzero b accounts for a running wave component (unequal beam intensities), for incoherent components of the imprinting optical field in the core material, and approximately for modulation that is outside the optical band of interest. More general equations can be written to account for either sequenced or concurrent superimposed modulation. In such modulated regions the exponent might be replaced by a squared sum in the case of concurrent exposure to several crossed beam, or sum of squared terms in the case of serial exposures to individual pairs of crossed beams. When the exponent is small, n $F(\phi)$.

Coupled Mode Theory of Multiply Periodically Modulated Comb Filters. The coupled mode theory, derived from Maxwell's equations, is used to develop basic wave equations characteristic of a particular waveguide configuration, including an induced, mutually induced or permanent periodic refractive index perturbation. The theory is accurate when the index modulation amplitude is small. The analyses can be formulated to include uniform attenuation due to waveguide leakage, absorption, scattering and to include uniform gain. The theory results in a coupling coefficient Km for each peak in a comb filter spectrum. Each Km derivation involves a Fourier transform of a one dimensional periodic modulation of the dielectric constant in the appropriate volume of space. If the modulation depends on other dimensions than the periodic direction, then this functional dependence has to be integrated into the analysis. This process is illustrated for a square wave notched surface thin film waveguide by Yariv et al, supra.

Use of coupled mode theory for analysis of weakly modulated waveguides and fibers is formally similar to the one dimensionally periodic analysis used for thin film filters. Analyses and applications of periodically modulated waveguides and fibers are taught by Yariv et al, supra, Yeh (*Optical Waves in Layered Media*, John Wiley & Sons, NY (1988)), Yeh et al ("Contradirectional Frequency-Selective Couplers In Guided-Wave Optics," Appl Opt 19, No 16, pp 2848–55 (1980)), Tien, "Integrated Optics and New Wave Phenomena in Optical Waveguides," Rev. Mod Phys, 49, No 2, pp 361–420 (1977)), Marcatili ("Dielectric Rectangular Waveguide and Directional Coupler for Integrated Optics," The Bell System Tech Journal, 48, pp 2071–2102 (1969)), and Hall ("Selected Papers on Coupled-Mode Theory in Guided-Wave Optics," SPIE Milestone Series, Vol MS 84, Thompson, Gen Ed, SPIE Opt. Eng. Press, Bellingham, Wash. (1993)). The analyses related to the application of mpm include treatments of Bragg modulated waveguides, distributed feedback lasers, frequency multiplexers involving codirectional coupling between adjacent waveguides, and contradirectional coupling between waveguides separated by a modulated smaller-index structure, coupling between bound modes and cladding modes, and coupling between guided and free space modes. These analyses can be extended to include mpm. A constant isotropic gain and/or loss can be included in the analysis of multiply periodic structures as has been done in the analysis of singly periodic films and singly periodic waveguides by Henry et al (in Presby, Ed., "Selected Papers on Silica Integrated Optical Circuits," SPIE Milestone Series, Vol MS 125, Thompson, Gen Ed SPIE Opt. Eng. Press. Bellingham, Wash. (1996), p 202), and Yariv et al, supra. The case of gain is used in the analysis of distributed feedback lasers (Yariv et al, supra). The same equations apply to mpm as for simple Bragg modulation. The difference is that in the latter case one coupling coefficient describes the characteristics of reflection and transmission near one reflection peak, at wavenumber $y_1$, whereas for mpm there is a separate coupling coefficient $\kappa_m$ for each reflection peak, $y_m \approx my_1$ in the band of interest. The Km are used to calculate the reflection amplitude and intensity and the peak fractional half width, and can be used to calculate the position and amplitude of side lobes adjacent to the comb peaks and the minima between lobes.

The comb spectra for HTC filters illustrated in Land et al, supra, were calculated using software based on matrix methods. The major spectral characteristics of numerous comb filters, like those included here in FIGS. 7–9, were derived systematically using the coupled mode theory. Microsoft Excel™ software was used to calculate the coupling constant, $\kappa_m$, for each comb peak, which was then used to calculate the peak optical density and half width. The coupling constants, $\kappa_m$, can be used to approximate the complete reflection and OD spectrum by using the standard equations of coupled mode theory, but this has not been done. The Bragg equations, $$m\lambda_m = 2n_a L_R \cos\theta; k_m = \frac{\pi m}{n_a L_R \cos\theta}; y_m = \frac{m}{2n_a L_R \cos\theta}.$$

$$m'\lambda_{v,m'} = 2n_{a,v} d_v \cos\theta; k_{v,m'} = \frac{m'\pi}{n_a d_v \cos\theta}; y_{v,m'} = \frac{m'}{2n_{a,v} d_v \cos\theta}$$

predict the wavelengths and wavenumbers of peak reflection by an mpm structure and its individual elements. The modulated space may be within or on the boundary of a waveguide or within a region separating two waveguides through which an evanescent field extends. Situations of concern here are nominal plane waves and simple one-dimensional modulation involving a major period length, $L_R$, containing segments of length $s_v$ comprised of minor periods having period lengths $d_v$. Here m is the order number of a vacuum wavelength $\lambda_m$ and of the corresponding wavenumber $y_m$ and of the wavevector magnitude $k_m=2\pi/\lambda_m$. Similar definitions apply to the second equation with m' replacing m. The wavevector in the propagation direction is designated by $\beta_m=n_a k_m \cos\theta$; $\theta$ is the angle between the wavevector $k_m$ and the direction of the modulation; $n_a$ is the average refractive index for the period $L_R$ and $n_{a,v}$ is the average index for a filter element $f_{u,v}$ with element length $s_v$; $n_{eff}$ is the effective index for a particular waveguide mode of the unmodulated waveguide which may be the single mode supported. This development is primarily concerned with single mode waveguides, so $n_{eff}$ for the filter area will be labeled $n_a$ and $\cos\theta \approx 1$ is dropped. That is, $n_a$ represents $n_{eff}=\beta_m/k_m \approx n_a \cos\theta$ for the modulated section of the waveguide.

In most cases only m'=1 or m'=2 are of interest for this second equation. The band of interest contains the fundamental or the next higher order reflection peak for each of the elements, $f_{u,v}$. The second subscript is dropped when m'=1, that is $y_{v,m'} \rightarrow y_v$. The only known reason that the second order reflection spectral range m'=2 of the elements $f_{u,v}$ might be of interest is where the modulation size needed to provide first order could not be conveniently developed.

In the cases to be illustrated conditions imposed on the filter, $n_{a,v} s_v$=constant, will result in missing reflection peaks, $\kappa_m = 0$, when m is a multiple of V, except when $y_m = Y_{v,m}$, v=1 to V. In most cases the filter would be designed such that the missing peaks are outside the spectral range of interest. However, if this is not the case, a small continuous modulation can be superimposed with the mpm so that the otherwise missing peak is included. Superimposed (parallel) modulation can of course be used to increase the reflection amplitude of any selected reflection comb peak.

In the cases considered specifically below (Tables 1–3), the $f_{u,v}$ are the same for all u, and the $n_{a,v} s_v$, optical wavelength of filter elements, are assumed to be the same for all v so that, $$\sum_{v=1}^{V} n_{a,v} s_v = V n_a s_1 = n_a L_R$$

Figure 7:
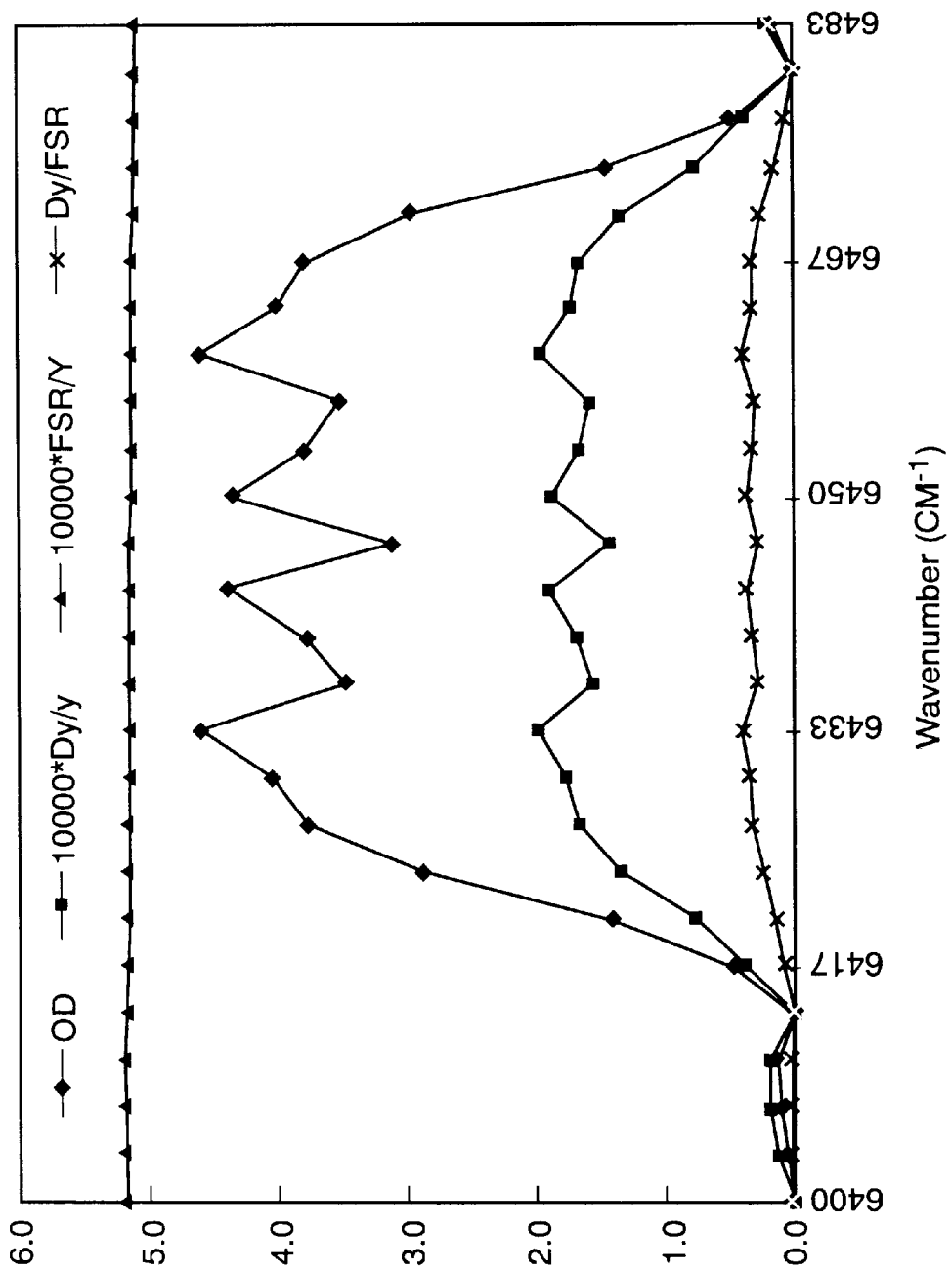
FIG. 7 shows graphically calculated spectral properties of fiber filter 1 described in Table 1.

If one refers to the typical plotted dispersion curve for waveguides operating in the single mode range, it is clear that the effective index $n_{eff}$ changes with wavenumber as a result of end point changes, which depend on the material dispersion, $dn/d\lambda$, and also with the local slope of the dispersion curve. Therefore, the spacing, free spectral range (FSR) between comb peaks $y_m$ rather than being constant will change systematically with m. In the examples considered here, the maximum separation of peaks in the 1.5 micron band width 30 nm is 2% of the band center wavelength. An analysis of the change in peak positions calculated from material related phase dispersion in silica waveguides for one modeled comb spectra, FIG. 7, showed shifts smaller than theoretical peak widths to be expected in the 1.5 micron 30 nm wide band. In many cases, however, dispersion will definitely significantly change the spacing of comb peaks from nominal integer multiples of the fundamental. Also, since $n_a$ changes systematically with dose, one may anticipate a continuous shift in comb peak positions with dose toward a target set based on a planned $n_a L_R$. In some cases it should be possible to monitor the comb peak specral shift toward a target configuration as the mpm is developed in the waveguide (Williams et al, "Photosensitive Index Changes in Germania-Doped Silica Glass Fibers and Waveguides," pp. 55–68, in SPIE Proceedings Vol 2044, "Photosensitivity and Self-Organization in Optical Fibers and Waveguides," Francois Ouillette, Ed, Quebec, Aug. 17–18 (1993) and Othonos et al).

The above equations apply to free space propagation, planar waveguides and linear waveguides such as those having rectangular, circular and elliptical cross sections. The spatially more restrictive linear guides can be imbedded in and developed on the less restricting planar guides or arrayed on substrates, and these linear guides may be designed to exchange wave energy. Mpm can be applied to some of these waveguide configurations to support a variety of applications.

In the cases treated specifically here, the waveguides are considered to be single mode type. The difference between cladding and core indices is typically 0.2 to 1% for a single mode waveguide (Keiser, *Optical Fiber Communications*, $2^{nd}$ Ed. McGraw-Hill, N.Y. (1991), p 51). In the case of linear waveguides the most desired index modulation has equiindex plane contours perpendicular to the propagation vector $\beta$ in which case $\cos\theta \approx 1$. These are the presumed conditions for the waveguide filters modeled here. However, experimentally an mpm waveguide may contain unwanted short sections of slanted modulation or unwanted modulation imprinted by an unwanted slanted standing wave pattern superimposed with the desired modulation. Also in some cases photoinduced modulation may cause a large enough change in the core index to permit the confinement of more than a single mode; this alone may not be detrimental since only one mode can propagate into and away from the modulated section.

Refractive Index Modulation in Optical Fibers. The literature reports many Bragg filters being developed in doped silica fiber waveguides (cites omitted). The filters are presumed to be coherently coupled over lengths in the mm-cm range. Similar lengths of coherent modulation, both stepwise short-long modulated segments, and mpm representable as sinusoidal, rectangular and other forms, can be produced in waveguides and fibers. A complication is that the average index usually changes with dose in holographically written waveguides whereas this is not a problem in thin film filters (Othonos et al, supra). Also, the form of index modulation may evolve with dose because of saturation effects; the nature of the modulation also depends in some cases on the intensity of the standing wave modulation that induces the index modulation.

Figure 3B:
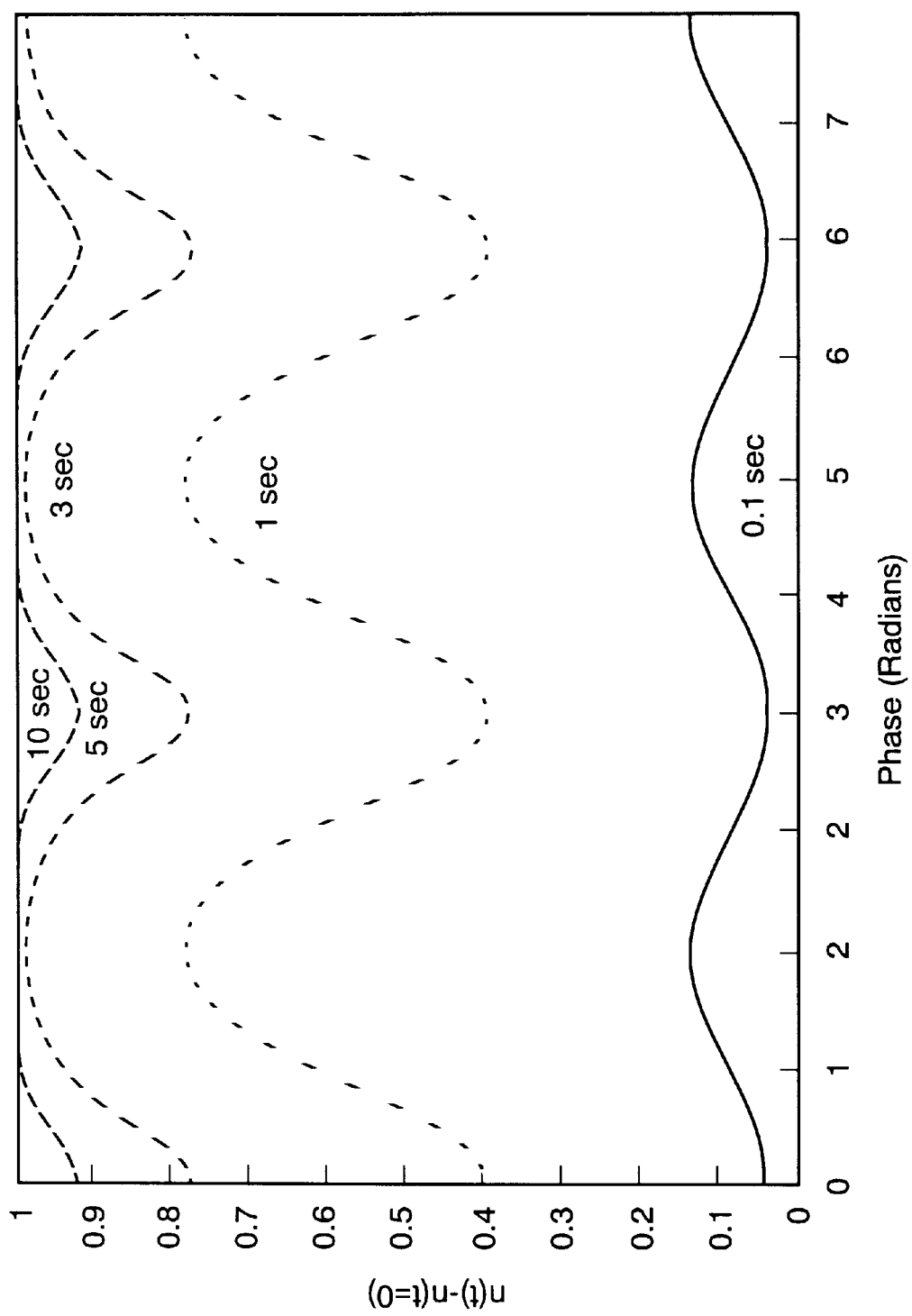

Williams et al, supra, discuss the presumed change in index modulation of optical fibers with exposure to spatially periodic 244 nm uv, as deduced from the evolution of the fiber infrared reflection near 1.5 $\mu$m, and from the evolution of absorption of ultraviolet by thin films of similar composition. The family of curves representing a changing form of index modulation in their FIG. 5 is said to be related to the $sinc^2$ like functions which relate to the characteristic increase in reflection sideband amplitude with radiation exposure. A similar family of index modulation curves is generated here by assuming that the effective index of a filter element varies with exposure time t as $n-n_o$ $1-\exp[-(a \sin^2\phi+b)t/\tau]$, where $n_o$ is the effective index of the unmodulated fiber core. Example curves for a range of t values are plotted in FIG. 4. Here $\phi$ is the standing wave phase along a modulated section of fiber. The ratio a/b decreases as the writing beam interference fringe visibility decreases; b is zero for a perfect standing wave case with no background light from scattering or unwanted light rays; this is apparently the case represented by FIG. 5 of Williams et al; $\tau$ is a time constant associated with the beam intensity I, and the waveguide UV absorption $\alpha$. It is assumed that the index change depends linearly on intensity and time until saturation effects become noticeable. For short times $n-n_o$ $\sin^2 \phi$ $\cos 2 \phi$ as illustrated in FIGS. 3a and 3b.

Technology exists for imposing in or on waveguiding layers coherent mpm over distances orders of magnitude larger than that achievable by thin film deposition. The methodology includes optical fringe counting and use of piezoelectric, capacitive or inductive devices to achieve accurate positioning at the picometer level (QPS Technology, Inc. and Bragg Photonics, Inc., Dorval, Quebec, Canada; Spanner et al, "Piezo Actuators Move in the Nanometer Regime," Laser Focus World, pp 161–168 (Nov 1996); Zankowsky, "High-Performance Tools Position Accurately," Laser Focus World, pp 135–138 (Jan 1997); Zankowsky, "How the Proper Positioner Keeps Fiber Aligned," Laser Focus World, pp 137–140 (February 1996)). These methods may provide phase gratings for cross beam intensity modulation or used directly in developing waveguide index modulation.

The literature pertaining to modulated waveguides and fibers contains examples of (a) focused single pulse induced stepped modulation involving fiber translation steps as small as 1 $\mu$m between rapidly repeated exposures, (b) periodic modulation with filter modulation periods, d<1 $\mu$m by exposing fiber cores through adjacent phase masks with lengths up to 10 cm, and (c) modulation by otherwise crossed beams (Russell et al, "Fiber Gratings," Phys World, pp 41–6 (Oct 1993); Malo et al, "Photosensitivity in Optical fiber and Silica-on-Substrate Waveguides," SPIE Proc Vol 2044, "Photosensitivity and Self-Organization in Optical Fibers and Waveguides," pp 42–54, Ouillette, Ed, Quebec, (Aug 1993); Hill et al, "Bragg Gratings Fabricated in Monomode Photosensitive Optical Fiber by UV Exposure Through a Phase Mask," Appl Phys Lett, 62(10) pp. 1035–37 (1993); Malo et al, "Single-Excimer-Pulse Writing of Fiber Gratings by Use of a Zero-Order Nulled Phase Mask: Grating Spectral Response and Visualization of Index Perturbations," Optics Lett 18(15) pp. 1277– 79 (1993); Dyer et al, "Analysis of Grating Formation With Excimer Laser Irradiated Phase Masks," Optics Comm 115, pp 327–34 (1995); Othonos et al, supra). These methods can incorporate accurate translation of the fiber or of the writing light standing wave pattern. Phase masks (gratings) are reported to be the most economical and accurate method of mass producing Bragg type modulated fiber waveguides using electron beam/clean room fabrication of masks with one-picometer accuracy within an electron beam writing field (QPS Tech, Inc., supra). Phase masks may be similarly prepared to be used in writing multiply periodic index patterns in waveguides and fibers. Phase errors associated with stitching of phase mask fields written by an electron beam or other means are reported to be systematic (Albert et al, "Minimization of Phase Errors in Long Fiber Bragg Grating Phase Masks Made Using Electron Beam Lithography," EEE Photonics Tech Lett 8(10), pp 1134–6 (1996)). If the stitch errors are systematic, it may be useful to make the stitch length equal to $L_R$ where practical.

Modulated multimode waveguides generate separate reflection spectra for each propagating mode, which may be too complex for use of mpm. A somewhat simplified situation is to use mpm in multimode waveguides where only one mode is launched into the guide.

Most literature on Bragg modulation concerns single mode fibers rather than multimode fibers. Reasons for this may include extensive use of single mode fibers for communication links and the fact that ultraviolet absorption by a doped fiber core limits the depth and uniformity with depth of the modulation. Single mode waveguides will be emphasized here, but the modulation of multiple mode waveguides is within the scope of the invention.

Single mode silica fibers can be prepared with approximately uniform cross-section modulation through the core. In most cases doped fiber cores are exposed to UV light through an undoped $SiO_2$ cladding after removal of a section of outer organic cladding material. But fiber cores have also been Bragg modulated at the cladding-core interface by rapidly repeated single pulse exposures through the $SiO_2$ cladding as the fiber is pulled, before external polymer cladding is applied (see Russell et al or Malo et al, supra). A similar approach to imposing modulation approximating that shown in FIG. 2 could be developed.

Demonstrated modulation effects on light propagation in germanium doped silica fiber waveguides include selective reflection of narrow wavelength bands along the core and also the selective coupling of wavelengths from the core to the cladding (Russel et al). Selective reflection within a waveguide core and codirectional or contradirectional coupling between cores are of primary interest here.

The maximum ultraviolet photoinduced index modulation amplitude, $\Delta n/n_a$ currently achievable in silica communication fibers is of the order of 0.1%. Many modulation periods are necessary to yield a substantial optical density, and reflection line widths are very narrow for high quality single pitch modulation. Lines have been intentionally broadened by chirping (systematically increasing the modulation spatial frequency relative to the input side of a filter) and can be broadened to some extent by increasing the modulation amplitude. Random small deviations from a perfect multiply periodic structure will cause line broadening and reduced optical density.

Filters providing narrow, more or less closely spaced reflection lines within a single mode band are of interest with respect to m/d of fiber guided light and for developing feedback in fiber lasers (Juma (interview), "Fiber Bragg Gratings: Ready to Drive Markets," Lasers and Optronics, pp 41–44 (May 1996); Juma, "Bragg Gratings Boost Data Transmission Rates," Laser Focus World," pp s5–s9 (November 1996); Grubb et al, "Fiber Raman Lasers Emit At Many Wavelengths," Laser Focus World, pp 127–134 (Feb 1996); Erdogan et al, "Fiber Phase Gratings Reflect Advances In Lightwave Technology," Laser Focus World, pp 73–80 (February 1994); Othonos et al, supra). Mpm may provide for generation of selectable fiber laser lines from nominally equally spaced line sets, $y_m$, and may provide matched filter sets for cascade m/d of interdigitated frequencies.

The literature concerned with UV induced modulation of hydrogen infused germanium-doped silica fibers indicates that in some cases where fibers are exposed to intense single pulses the modulating effect is limited to an outer part of the fiber core. Modulation is attributed to optical damage resulting from nonlinear absorption effects, probably melting, and the damage spot is smaller than the size of a focused spot (Russell et al, Malo et al, Hill et al, supra, and Dyer et al, "Analysis of Grating Formation With Excimer Laser Irradiated Phase Masks," Optics Comm 115, pp 327–34 (1995)). The filters are stable to high temperatures. The modulation reduces the symmetry of modes in circular cross section fibers which normally simplify analysis of waveguide performance and causes dichroic filtering; wavelengths shorter than a certain wavelength are coupled out of the core (Russell et al, supra). This method of modulating silica fiber may be suitable for imposing coherent mpm but the consequences are not so easily anticipated as those of uniform cross section. Dichroic coupling of shorter wavelengths out of the core behaves similarly to planar waveguides where modulation is etched in the boundary of the core (Presby, supra, p 205; Boyd, Ed, *Integrated Optics: Devices and Applications*, IEEE Press, New York (1991), p 337).

The exposure conditions of most interest are those causing essentially uniform modulation through the thickness of a single mode fiber core. This modulation provides for reflection within the fiber core and for tapping selected wavelengths out of the core in case the modulation is slanted (Hall, supra). Approximately uniform modulation through the core is usually inferred if the UV absorption is not excessive, since single mode core diameters are typically less than IO microns.

As discussed above, the average effective index of photosensitive waveguides and fibers normally changes as the modulation amplitude develops. Therefore, to produce coherent multiply-periodic-modulation, the index modulation amplitude must be controlled to produce the required average optical length period $n_aL_R$ and/or local optical length period $n_vd_v$ for each element. In most cases the correct exposure would be determined by trial or by monitoring reflection in the band of interest during development of the index modulation. Visible and infrared reflection and/or transmission can be monitored and possibly optimized while the index modulation is imposed by lateral exposure of a waveguide to crossed UV light beams forming a standing wave (Williams et al, Othonos et al, supra). That would appear to be an option for the various methods discussed here if the modulation develops to the finished state during the imprinting by crossed beams.

Shifts in peak wavelength with temperature changes are an important consideration. One method of stabilizing a comb spectrum is to mount the waveguide on a low expansion material to minimize temperature related change in the waveguide optical lengths $n_a(T)d_v(T)$. Mounting materials that limit peak wavelength shift to about 0.005 nm/° C. include glass and aluminum alloys.

Potential applications where mpm might replace serial or parallel modulation are listed here. Raman multiline fiber lasers are described by Grubb et al, supra. A series of Bragg gratings are developed adjacent both ends of the fiber laser section. Since Raman and Stokes energy levels tend to be equally spaced, mpm would be appropriate modulation for this application. Thin film mpm designs were developed within this invention to match the major visible band Raman lines emitted from a YAG:Nd pumped $H_2$ (see also "Single-Mode Tunable Laser Backs Up Optical Networks," Photonics World (February 1998) p 32.) Fiber lasers produced by Altitum, Kista Sweden can be fixed within or tunable over the 1.5 band of erbium doped silica. The Altitum laser gets feedback from a "grating" that reflects 10 or more wavelengths; mpm might be applied to this application; mpm might be included within a distributed feedback lasing medium or be used to provide feedback to a lasing medium. Use of phase masks to write modulation in distributed feedback lasers is discussed by Pakulski et al ("Fused Silica Masks For Printing Uniform and Phase Adjusted Gratings for Distributed Feedback Lasers," Appl Phys Lett 62(3) pp 222–4 (1993)). An overview of distributed feedback lasers for fiber and integrated optics was published by Grafouri-Shiraz et al ("Distributed Feedback Lasers: An Overview," Fiber and Integrated Optics 10, pp 23–47 (1991)).

Douay et al ("Pump Power and Birefringence Effects in Nd3+ and Pr3+ Fiber Lasers Using Intra-Core Bragg Reflectors," pp 246–260, SPIE Proceedings Vol. 2044, "Photosensitivity and Self-Organization in Optical Fibers and Waveguides," Ed. Francois Ouillette, Ed, Quebec (August 1993)) describe vernier effects in the emission of Nd 3+ and Pr3+ fiber lasers related to interaction of the lasing medium with bounding Bragg modulation and with reflections from fiber end faces whose phase depend on the cavity length between a Bragg filter and an end face. The coupled reflections were used to reduce the line width of the laser emission, and stretching of the assembly was used to tune the laser emission. Mpm could be incorporated into structures of this type in place of simple Bragg filters for applications such as temperature and strain measurement or control.

Photonic Integrated Circuits. In addition to writing Bragg type modulation in optical fibers, similar one-dimensional modulation can be written in planar waveguides, in linear waveguides and between or adjacent to parallel linear waveguides formed in waveguiding planar waveguides designed to provide integration of optical and photonic devices. Materials with potential for use in integrated optical circuits include fused silica based glass, Fe doped $LiNbO_3$, SBN, GaAs/GaAlAs, glass, ZnO, photolime gel polymer, polymer dispersed liquid crystals, and Du Pont, Poloroid and other photopolymers (Presby, Ed, supra; Boyd, Ed, supra; Chen, supra; Natarajan et al, "Electrically Switchable Holograms Containing Novel PDLC Structures," pp 182–190 in "Liquid Crystals," SPIE Vol. 3143 (1997); and Monroe et al, "Photopolymers for Holography and Waveguide Applications," pp-145–169 in "Polymers for Lightwave and Integrated Optics," Hornak, Ed, Marcel Dekker, Inc., New York (1992)). An advantage of gels and some other organic materials is that relatively large changes in refractive index are possible. Devices employing these material systems can be trimmed, tuned or switched by electric fields or thermally. Mpm may be used with other planar waveguide elements making up integrated devices.

Photonic integrated circuits in photolime gel polymer are discussed extensively by Chen, supra. Spun films ranging in thickness from 1 to 100 $\mu$m are developed with a controlled refractive index profile to provide for a guiding layer. Areas of a cured film are then selectively exposed to ammonia dichloromate solution using photolithographic techniques to develop dichromatic gelatin (DCG) which can be holographically modulated using 488 nm light. The high optical quality DCG permits a broad range of index modulation amplitudes with maximum total change in index as large as 0.2 and waveguiding loss in the range 300 to 2700 nm is reported as 0.1 dB/cm. Therefore both moderately short and long HTC filters may be developed with substantial optical density.

Gels with graded index profiles provide for guiding on a variety of substrates, and miniature prisms can be used to feed a selected propagation mode into a guiding layer. Chen demonstrates demultiplexing of Ti:Al$_2$O$_3$ laser light in the near infrared using superimposed (parallel) slanted modulation to provide angular separation (fan out) of 12 optical bands. He discusses the possibility of separating as many as 300 bands before saturating the modulation. The interaction length of the superimposed modulation described by Chen was 400 $\mu$m in the case of separating 12 bands and he discusses interaction lengths being extended to 1 cm. A slanted mpm alternative to the serial or parallel Bragg modulation discussed by Chen is illustrated in FIG. 5. This modification produces diffraction effects that need to be considered in designing mpm. With $s_v >> \lambda$ the diffraction orders greater than zero order are likely to be negligibly angularly displaced from the zero order peaks for each slant configuration. This is opposite to the design of arrayed waveguide gratings mentioned below, which are designed so that the $\theta \approx 0$ orders for all of phase delay related orders m occur at angles smaller than the first and higher order diffraction angles for all m.

Examples of integrated circuit elements and combinations that might be used in conjunction with mpm, and in some cases be replaced by mpm, include straight sections, bent sections, y-branches, x-crosses, contradirectional and codirectional couplers, fixed and tunable Mach-Zehnder interferometers, arrayed waveguide gratings, NxN star couplers, F-P cavities with singly modulated Bragg mirrors, grooves and films for stress control of birefringence, and thin conductive film for thermal or electric field phase shift controlled switching. Some of the common devices are formed from combinations of simpler optical circuit elements (see Presby, supra, p 22). Simple serial, parallel and multiply periodic Bragg modulation and combinations thereof might be included in such a grouping of tools. Applications include fixed and switchable m/d, narrowing of laser lines, and generating multiple, tunable, or switchable laser lines.

Tools for m/d information in optical channels in thin films include codirectional, contradirectional and dispersive coupling. Codirectional coupling alone can be used for m/d, usually for separating and combining wavelengths on a coarse scale, and is used as part of a Mach Zehnder m/d to separate interspersed wavelengths in cascade fashion on a fine scale.

Folded codirectional coupling is illustrated in FIG. 5a as used by Hicks with an F-P filter to provide for serial m/d (U.S. Pat. No. 4,768,849). Similar coupling using serial and parallel Bragg filters could have been illustrated as well. FIG. 5b' shows a comparable mpm filter for cascade type m/d. Mach Zehnder, F-P and mpm means can be used to m/d closely spaced frequencies and the devices can be cascaded to sequentially separate interspersed wavenumbers.

Codirectional coupling illustrated above involves induced modulation. Codirectional coupling can also be accomplished by Bragg modulation in a waveguide adjacent to the trunk waveguide. For example, an F-P filter formed by providing a ¼ wave offset in the center of a simple Bragg structure properly terminated at one end can be used to cause codirectional branching of a single narrow line as the F-P is driven to resonate under the influence of the evanescent field residual. This arrangement has a similar structure diagonally opposed to the first structure that is terminated at both ends. The inferred purpose of the second F-P is to prevent light of the selected frequency from continuing along the trunk line; prevention is inferred to be a consequence of damping or destructive interference. An F-P structure might be replaced by a mpm pair with basic period length $L_R$, total length L, separated by a length $(m+¼)\lambda$, where $\lambda$ is the mean wavelength of, say, the 30 nm wide 1.5 micron band, $(\lambda_{max} - \lambda_{min})/\lambda_{mean} << \lambda_{mean}$. This structure would be capable of contributing to m/d an interdigitated comb spectrum. The same analogy can be applied to a ¼ wave cavity F-P type structure bounded by identical Bragg structures with no external connection. This structure is referred to as a quarter wave shifted distributed feedback resonator. It is placed adjacent to a trunk line which is connected to a laser cavity. The structure has been used to narrow a single line emitted from a laser operating in the 1.5 micron band (Presby, supra, p 247). The Bragg structures could be replaced by a commensurate mpm pair spaced by $(m+¼)\lambda$ to provide narrowed multiple line or line switchable laser emission. A variation might be to use mpm reflectors with offset comb peaks and somewhat different FSRs. At least one mpm would be tunable so that a single resonance could be selected. If one mpm is fixed, it would determine the resonant frequency set. If both reflectors and the cavity were tunable, it might be possible to provide continuously tunable narrow laser emission lines for a range of wavelengths such as the 1.5 micron band. This might be similar to the Altitun system briefly described by Tatterson ("Single-Mode Tunable Laser Backs up Optical Networks," Photonics Spectra, p 32 (February 1998)).

Contradirectional coupling is light coupling from one mode to a like mode propagating in a reverse direction in the same or a neighboring waveguide. An example of this is shown in FIG. 5b where the space between or adjacent to a waveguide pair is modulated with a simple Bragg structure to provide serial m/d, and in FIG. 5b' with mpm for cascade m/d of interdigitated wavenumbers.

Codirectional and contradirectional coupling between rectangular single mode waveguides prepared in or on films were discussed by Yariv et al, Yeh, Yeh et al, Tien, Marcatili, Keiser, supra.

Diffractive coupling to and from a waveguide core is one of the tools or problems associated with modulation at the boundary of a waveguide core (Boyd, supra, p 337). For example the modulation may be used to couple energy to or from a waveguide; diffractive coupling may be a problem, however, for contradirectional coupling within a waveguide, and the short wavelength reflections are diminished by unwanted diffractive coupling to the cladding or free space (Presby, p 117). Mpm used at core boundaries will add to the range of diffractive tools.

There are several methods of broadcasting, switching and m/d optical channels in planar waveguides. Mach Zehnder combined with codirectional couplers, and directional couplers alone is can be used to provide cascade type m/d. The combination provides for fine interdigitated division while the coupler alone provides coarse selection. Combinations can also provide improved an improved method of serial or add-drop m/d (see Presby, pp 33, 238, 249, 270, 290). They provide a nominally equal-width cusp-like pass or branch spectral characteristic for interlaced wavenumbers. The potential advantage of mpm instead of Mach Zehnder is that mpm can be designed with variations in the relative width and shape of the pass and blocking bands, and mpm is anticipated to exhibit better channel separation.

Another versatile m/d device class is the arrayed waveguide grating which provides for dispersing wavelengths angularly within a planar waveguide. Typically the channel termini are shaped to focus the dispersed radiation to waveguide apertures, which would permit very dense m/d. If m/d is an equally spaced wavelength, or frequency grid, an arrayed waveguide grating m/d can be designed to compensate for dispersion by tailoring the placement of the receiving array, and to some extent by taking dispersion into account by design. A frequency grid is most appropriate for comb filters. Multiplexing of more widely spaced grids is described as WDM (wavelength division m/d) while more densely spaced grids are related to frequency as FDM. Since dispersion is always encountered, often significantly, constant spacing of channels may often not be a suitable standard.

Advantages that mpm may have over arrayed waveguide grating m/d are better channel separation and more economical production. The most direct comparison is slanted mpm, which together with waveguide focusing optics or external focusing optics provide for the m/d of angularly dispersed light among waveguides, and for other functions. In this case, as with arrayed waveguide gratings, the aperture of receiving and emitting waveguides can be arranged physically to compensate for dispersion and can accommodate uniformly spaced channels.

Referring now to the drawings, FIG. 1 a shows a section of a waveguiding medium 11 within or onto which mpm 13 is imposed. Medium 11 may be considered to be part of a waveguide of any geometry, and composed of any optical material transparent to a range of wavelengths such that wave propagation is limited to either one or two dimensions. For example, the waveguide may consist of an optical fiber or a waveguide having a cross section small compared to the fiber length (linear waveguide), or it may consist of a thin film (planar waveguide) where propagation can occur in any direction within a layer within the film. The modulation of the invention has one-dimensional periodicity in all cases along the waveguide axis.

FIG. 1b illustrates one-dimensional modulation 15 of the optical dielectric constant $\epsilon = n^2$ of a series of filter elements f(u,v) which may repeat identically after a period length $L_R$ or more generally which repeat characteristically by the recurring onset of a common local physical and/or optical periodic length $d_v$ and or $d_v$ at a spacing L(u,v). The symbols $\epsilon_a$, $\epsilon_w$, $\epsilon_s$, and $\epsilon_o$ represent the optical dielectric constants associated with the average in the filter, and with an anti-reflection layer, a substrate and air, respectively. The latter three symbols are typically pertinent to the termini of thin film filter modulation. In most anticipated cases of modulated waveguides, a modulated region is anticipated to be formed within, on or adjacent to a section of waveguide so that the average index and average optical dielectric constant of the modulated region will be only slightly different from that of the bounding unmodulated waveguide. Reflections at the filter boundary will therefore not be significant. Significant reflections may occur at the ends of waveguides and fibers and contribute to the reflection and transmission spectrum of an mpm waveguide.

In the example illustrated in FIGS. 1a and 1b, modulation 15 comprises three filter elements 16,17,18 in a series with constant modulation amplitude; the series is strictly repeated such that the lengths L(1,1)=L(1,2)=L(1,3)= . . . =L(U,V)= $L_R$. For this important special case, the symbol L(u,v) is replaced by a symbol $L_R$. $L_R$ is the basic physical periodic length of the filter having total length $L = UL_R$ where U is an integer. In FIG. 1b it is seen that the initial length $L_R$ contains three filter elements f(1,v), v=1,3, having lengths $s(1,v) = M(1,v)d(1,v) = s_v = M_v d_v$, v=1,V, where $M_v$ is an integer and $d_v$ is a local periodic length. In this special case with $L(u,v) = L_R$, the filter will produce a single set of reflection peaks equally spaced in wavenumber and frequency if dispersion is discounted. The average refractive index $n_a$ is presumed to be constant throughout the filter so that the filter design can use physical lengths to describe the periodic structure.

In general there may be more than one unique L(u,v) so that multiple sets of comb spectra may occur. Only a small number (one or two) appear to be practical. In FIG. 1b the index modulation amplitude is sinusoidal and uniform in amplitude and each filter element 16,17,18 consists of a whole number of periods. In general, each element type f(u,v) within a periodic length $L_R$ may have a unique type modulation of unique period $d_v$; it is not essential that elements contain a whole number of periods nor that the modulation amplitude be constant. Furthermore the average index $n_a(v)$ or n(u,v) over the length $s_v$ or s(u,v) of any one element may be different from that of any other element. These generalizations may be significant in modulated waveguides because of saturation effects, and by design in cases where filter elements f(u,v) consist of a relatively small number of periods. In the specific filter examples, Tables 1, 2 and 3, there is no apparent reason to include these generalizations because the index variations are small and the $M_v$ values are large; the form of modulation will not be different for different elements so long as the energy and intensity levels of the writing optical fields are uniform.

FIG. 2a shows a section of waveguide 21 with stepwise index modulation 23. FIG. 2b shows the variation of refractive index with thickness of a thin film filter or length of a waveguide filter. The symbols $\epsilon_a$, $\epsilon_w$, $\epsilon_s$, and $\epsilon_o$ have the same meaning as in FIG. 1b. This modulation case, where the reflection at each step is small, where $d_1 << d_2$, where $d_1 + d_2 = L_R >> \lambda_m$, and where $\lambda_m$ is a wavelength of a high order reflection of interest, is taught in Land et al '290. This HTC filter configuration may be considered to be a special case of the basic comb filter of Land et al '930. According to the general filter nomenclature of FIG. 1b, the structure may be considered singly periodic with a period length $L_R = d_1 + d_2$ or to be multiply periodic with two element types one having length $d_1$ and the other length $d_2$. This singly periodic structure is not an efficient means of providing high optical density, high order, comb-like reflections in a selected wavelength band. The multiply periodic ideally-stepwise modulation 15 of the general type shown in FIG. 1b is preferred for cases where the index modulation of elements are either ideally a square wave or rectangular in form, and the $d_v$ are chosen to place the significant comb spectrum in a selected band. The rectangular form includes the square wave modulation as a special case. An optical length square wave requires $n_{v,1}d_{v,1}=n_{v,2}d_{v,2}$. However, for small modulation amplitude the spectrum for the case $d_{v,1}=d_{v,2}$ is only slightly different.

When the sine wave type elements of FIGS. 1a and 1b are replaced by rectangular modulation, the nomenclature of FIG. 1b is changed to include a double subscript form $d_v=d_{v,1}+d_{v,2}$ where $d_{1,1}$ and $d_{1,2}$ represent the length of high and low or low and high index sections, respectively, of the period length $d_{v=1}$.

FIGS. 3a and 3b show the evolution of index modulation that is anticipated to occur in optical fiber waveguides as a result of exposure to a pair of crossed monochromatic beams (a generalization of a graphic illustration by Williams et. al, supra, in which the minima for all exposure times drops to zero as would occur ideally for cases where the writing radiation field consists entirely of a standing wave. The more general case depicted here is based on the assumption that the index change, which is normalized to a maximum value of 1, varies as $n-n_o=1-\exp[(-a \sin^2 \phi - b)t/\tau]$. Time t is shown, and the parameter values are $a=1$, $c=1$ sec$^{-1}$ and $b=0.02$ (FIG. 3a) and $b=0.5$ (FIG. 3b); $\phi$ is the phase angle of the standing wave which writes the modulation. The term b accounts for reduced contrast of the writing optical field caused by incoherent light, unbalanced writing beam intensities and unwanted modulation outside the band of interest. Some examples of how a writing field modulation amplitude and contrast may vary with the distance q from a phase mask as a result of superposition of multiple diffracted orders transmitted by phase masks where the degree of coherence of interaction rays decreases with increasing diffracted order $\theta$ are shown by Dyer et al, supra, FIG. 2b of which implies that the ratio a/b in the expression above typically decreases with q. To properly treat general cases, the $\sin^2 \phi$ would be replaced by a more complex form in the above equation that would depend on the distance between a phase mask and a waveguide oriented parallel to the phase mask. It would also depend on whether exposures are simultaneous or sequenced, in that the exponent would consist of a squared sum or a sum of squares. For those cases where t/τ is sufficiently small, the exponential terms can be expanded so that the index change caused by multiple exposures or simultaneous exposure may be represented by a series of terms linear in t/τ.

The consequences of approaching saturation of the index change in a waveguide is that the modulation form changes as the modulation amplitude changes with dose from an initial simple sinusoidal form, or linear superposition of sinusoidal forms, to some non-optimum form. The modulation amplitude reaches a maximum and then decreases. The average index of the filter elements changes with dose, and if the doses are significantly different for different filter elements a local average index must be considered in calculating the spectrum of an mpm filter. The filters modeled here have not included these complications which in many cases may be avoided. However, complex mpm forms may provide useful filters of the invention. Other factors to be considered are the possibility of significant absorption and scattering and undesired diffractive loss within the modulated part of a waveguide. The losses may significantly affect performance of filters in low loss single mode waveguide material. For example, modulation of optical fibers by intense pulses is attributed to physical damage or melting at the core-cladding interface (Dyer et al, supra; Archambault et al, "High Reflectivity and Narrow Bandwidth Fibre Gratings Written by Single Excimer Pulse," Electron Lett 29, (1993) p 28, and "100% Reflectivity Bragg Reflectors Produced in Optical Fibres by Single Excimer Laser Pulses," Electron Lett 29, p 453 (1993)). The modulation results in reflection and transmission loss on the short wavelength side of a Bragg peak because of diffractive coupling to the cladding or by scattering (Russell et al, supra).

FIGS. 4a and 4b show diagrams representing, respectively, serial (add-drop) and cascade m/d of optical carrier frequencies. Apparently a serial form (FIG. 4a) is the most frequently used or advocated method of optical m/d based on Bragg or F-P filters. FIG. 4b indicates that cascade m/d may be achieved by selecting half a carrier set where the half is distinguished by a greater or less than division of frequencies or by selection of the odd or even of interlaced frequencies. The greater or less than m/d might be done by a sequence of decreasingly broad band filters, but this would not provide good channel separation. The m/d of interlaced sets may provide advantages over channel interference since each stage of demultiplexing increases the spectral separation of carriers. The mpm cascade approach to m/d may provide better channel separation than other methods at each step in the cascade process. It is noted here also that the two forms of cascade separation indicated, greater than or less than and interdigitated, can be integrated. For example, a comb filter peak amplitude envelope can be shaped to select a subset of odd or even numbered frequencies from a set where the subset is characterized by containing frequencies greater or less than some frequency as well as being either odd or even. It is important to note that serial and cascade m/d can be mixed.

FIGS. 5a through 5e' show examples of F-P type or simple series or parallel (superimposed) Bragg filters may be replaced by mpm HTC filters for m/d. FIG. 5a illustrates one of several m/d devices discussed in Hicks '849 where F-P type filters in waveguides and in thin film form may be used to add or drop a single optical carrier frequency. In FIGS. 5a and 5a' the frequencies reflected by the F-P or the HTC comb filter are m/d to/from the branch waveguide by folded codirectional coupling. It is not apparent that cascade m/d as illustrated in FIG. 4b is an objective in Hicks '849. Although he suggests the possibility (col 1, line 50), Hicks describes a dielectric mirror bounded F-P with a fiber cavity length of 200 m$\mu$. What is not clear is the width of the reflection band of the dielectric mirrors and how many cavity resonances are supported by the dielectric mirrors. The dielectric mirrors are in line with the trunk waveguide so they would be expected to transmit any carriers not reflected by the dielectric mirrors together with the cavity resonant frequency(ies). A similar situation holds for mpm comb filters, in that the envelope of significant reflection comb peaks may not span the full range of carrier frequencies.

FIG. 5b indicates a case where a simple Bragg modulated section between waveguides causes the contradirectional m/d of one carrier between a trunk and branch waveguide. In FIG. 5b' the Bragg modulation is replaced by an mpm comb filter which permits cascade m/d between a trunk and branch by contradirectional reflection of a set of odd or even interlaced comb lines.

FIGS. 5c and 5d represent the angular fan out of carrier frequencies within a thin film planar waveguide by serial tilted Bragg modulation and by superimposed (parallel) tilted Bragg modulation. The corresponding case where the serial and parallel modulation are replaced by mpm is indicated in FIG. 5c' and 5d'. The three elements in the serial case are assumed to have a number of periods divisible by 3 and all are assumed to have equal length for simplicity. Each of these segments is broken into U separate segments and reconfigured to be multiply periodic. The condition $s_1=s_2=s_3=L_R/3$ holds so that $y_m=y_\nu$ when m is a particular multiple of V. The number and relative intensity of added diffraction peaks depends on the length of selected $s_\nu$ relative to $\lambda_\nu$, and the spacing $y_\nu=1/\lambda$. No specific modeling has been done, but the expectation is that the original zero order diffraction peaks for the serial case will be narrowed without loss of optical density. FIG. 5e' represents an expanded view of the slanted mpm that can be used in place of the modulation in FIG. 5c and 5d. The angularly dispersed light can be focused by either a planar waveguide lens or by an external lens as suited to the application. The slanted mpm in FIGS. 5c' and 5d' adds to the options available for m/d in planar waveguides using periodic modulation. The mpm configuration may permit greater density or greater number of carriers and/or better signal to noise ratio than would be permitted by the previously considered alternatives.

Figure 6A:
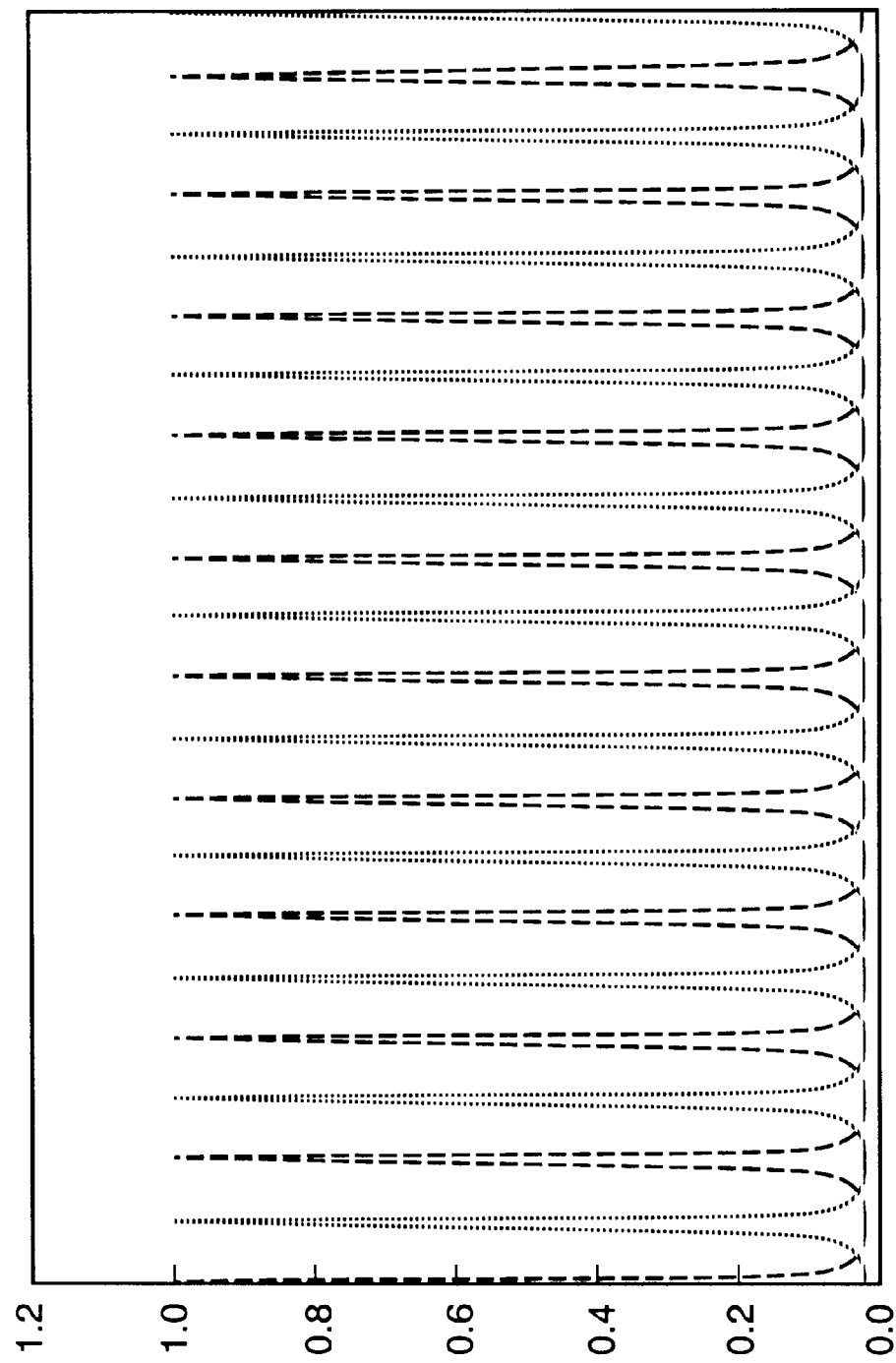
FIG. 6a illustrates two interlaced sets of narrow optical carrier bands, one set of which could be multiplexed/demultiplexed as shown in FIG. 5a'.

FIG. 6a shows spectral peaks relevant to the filter of FIG. 5a'. One of the interlaced odd or even sets is reflected and the other is passed by an mpm HTC comb filter. FIG. 6b shows spectral peaks relevant to the filter of FIG. 5b'. The carrier frequencies indicated by solid line peaks lying nearest the dashed and dotted line peaks are reflected by contradirectional coupling into the branch waveguide while the other solid line peak frequencies are passed. The dashed and dotted peaks correspond to frequencies that would be retroreflected in one or the other of somewhat differently configured waveguides by the modulation. This arrangement requires the free spectral range of comb spectra that cascade m/d odd or even numbered carriers to be substantially larger than reflection peak widths for the various coupling situations, i.e. retroreflection in one waveguide or exchange between waveguides.

Mpm HTC Filters for Multiplexing/Demultiplexing in 1.5 Micron Band. Referring now to FIGS. 7–16d, mpm HTC filters may be used in m/d frequencies in the 1.5 $\mu$m communication band which has a band width of about 30 nm. Hicks '849 teaches use of F-P filters to effect m/d with emphasis on serial m/d. In almost every example of Hicks, mpm in a continuous fiber core or mpm in an external thin film can supplant the F-P and provide cascaded m/d.

Filters in single mode silica fibers for use in the 1550 nm communication band are considered here. Typical parameters of single mode optical fibers are indicated by Keiser, p 51, and optical fibers designed for use in creating Bragg filters are described in specification sheets available from Bragg Photonics, Inc., supra.

Scobey et al ("Filters Create Thermally Stable, Passive Multiplexers," Laser Focus World, 111–16 (March 1997)) discuss serial multiplexing and demultiplexing using thin film filters employing multiple F-P cavities and indicate an upward trend in optical channel density in the 1550 band. Emerging standards are reportedly based on 100 gigahertz and 50 gigahertz grids. A 100 gigahertz grid translates into a wavenumber spacing (free spectral range, FSR) of 3.3333 $cm^{-1}$. Phase velocity dispersion in mpm waveguides causes unequal spacing between comb peaks, so that a strictly uniform frequency grid based on frequency or wavenumber may not work well with devices using mpm modulation nor with Mach Zender interferometers which are also capable of generating a broad spectrum of narrow reflection lines such that $(y_{max}-y_{min})/y_{mean}>$ a few percent. This is a disadvantage of devices which do not provide a means of compensation. For example, devices that provide for angular dispersion of light permit tailored placement of the receiving apertures at locations that compensate for effects of dispersion. There is no essential reason except for arbitrary standardization to require a strictly equally spaced frequency grid of communication frequencies. Dispersion is a ubiquitous problem, so a frequency grid designed to accommodate dispersion might be better suited. Certainly in many cases m/d may be used in local situations, such as linking an optical sensor array on a aircraft; frequencies could be generated and selected to be compatible with a total system requirement which could include convenient, economical m/d.

A fiber core with average effective refractive index of 1.5 is considered here as an example. The effective refractive index relates to the wave-vector component along the waveguide core in the wave equation; $n_{eff}=\beta/|k|$ where $\beta=kn_c \cos\theta$; $k=2\pi/\lambda$; $\lambda$ is the wavelength in air, $n_c$ is the core bulk real index, $\theta$ is the angle between k and the waveguide axis. This effective refractive index is within the range listed for photosensitive optical fiber core material. Here the $n_{eff}$ for the unmodulated single mode waveguide is called $n_o$ and the average effective index for the modulated waveguide is $n_a$ or locally $n_{a,\nu}$. There is an effective index for each propagating mode in a multimode fiber, so the nomenclature must be expanded to analytically treat mpm in multimode fibers where multiple modes are to be launched.

The $L_R$ value needed to produce a FSR=$y_1$=3.3333 $cm^{-1}$ is $L_R=\frac{1}{2}n_a y_1=1$ mm. The harmonic of $y_m$ nearest to the assumed band center, $y_c=6451$ $cm^{-1}$ or $\lambda_c=1550$ nm, has order number m=1935. Juma, supra, indicates the band over which erbium doped amplifiers operate as 1530–1560 nm, 1545 nm being the band center, the 30 nm band width being related to the amplification range of erbium doped fiber amplifiers.

A property of multiply periodic filters as taught by Land et al is that v type elements interact coherently at $y_m=y_\nu$ when all elements $f_{u,\nu}$ have the same optical length $n_{a,\nu}s_\nu=$ constant. A related property is that the coupling constant, $\kappa_m$, corresponding to the reflection maximum at $y_m=y_\nu$, where $y_\nu$ is the wavenumber of the fundamental reflection peak of the element type $f_{u,\nu}$, satisfies the same equation as does a simple continuous Bragg filter, that is, the coupling constant $\kappa\; M_\nu U \delta n/n_a$, where $M_\nu U$ is the total number of $d_\nu$ periods having a specific v label. The optical density of the filter is a function of $\kappa L$. Three such filters, each 1 cm in total modulated length L are considered here. The first two are based on a 100 gigahertz per channel grid. The third is based on a secondary 200 gigahertz per channel grid. The first filter comb lines have higher OD than those of the second filter but do not effectively span the full 30 nm communication band. The second and third filter comb lines span a full 30 nm, 125 $cm^{-1}$, band width. For the purpose of frequency m/d the second filter will pass half a band of 64 channels, either odd or even number channels, while reflecting the other half. The third filter has half the line density, FSR=6.6666$cm^{-1}$, of filters 1 and 2 so that it could be used in tandem to select half the lines passed by filter 1 or 2. Thus mpm together with folded codirectional coupling as shown in FIG. 5a' can be cascaded to develop the m/d branching tree of N carrier frequencies to N/2, N/4, N/8 etc as shown in FIG. 4b.

Figure 8:
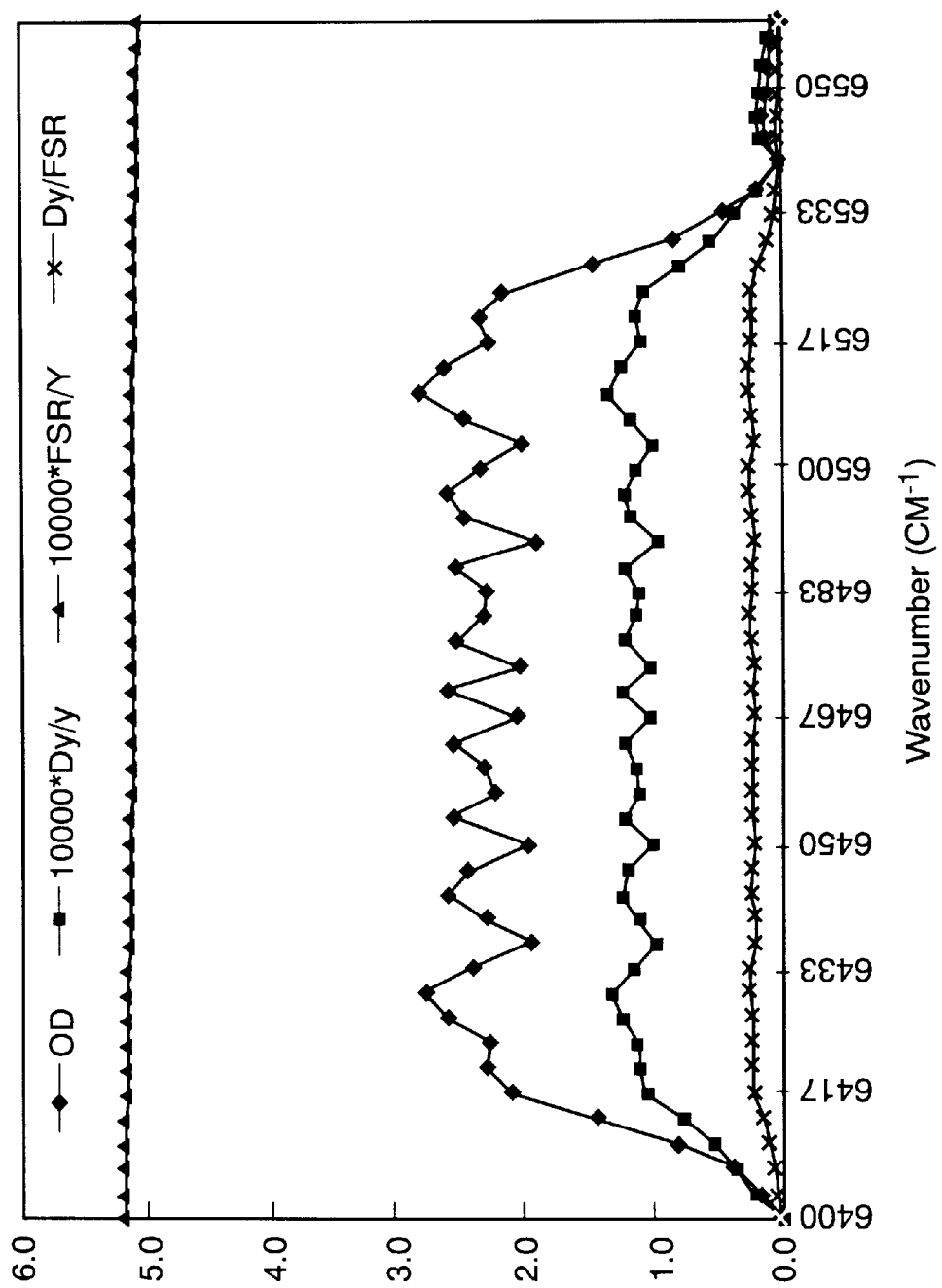
FIG. 8 shows graphically calculated spectral properties of fiber filter 2 described in Table 2.
Figure 9:
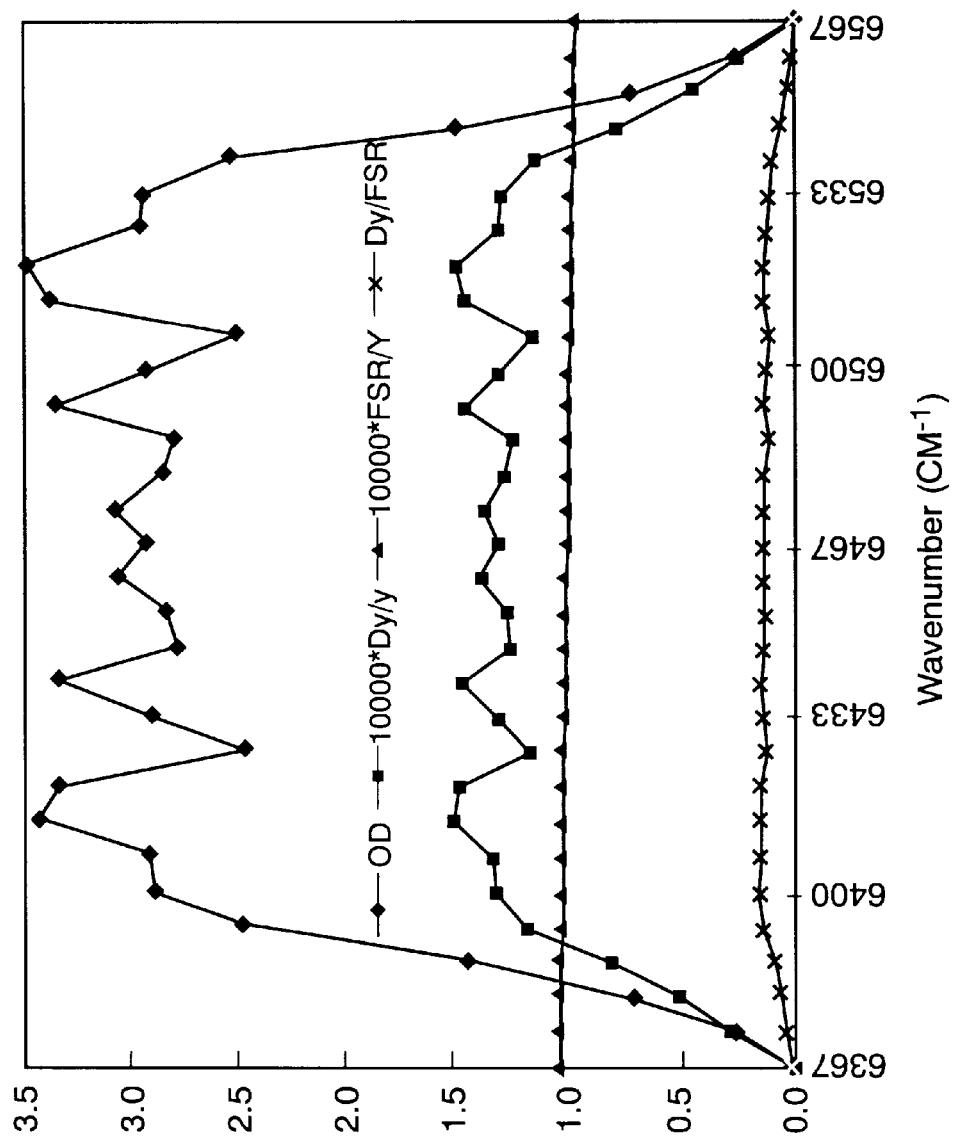
FIG. 9 shows graphically calculated spectral properties of fiber filter 3 described in Table 3.

FIGS. 7, 8 and 9 show reflection peak position, optical density and fractional half width Dy/y, fractional free spectral range FSR/y, and the ratio Dy/FSR of multiply periodic filters designed for multiplexing/demultiplexing optical frequencies transmitted in a 1.5 $\mu$m single mode optical fiber.

In accordance with the invention, a filter may be structured as follows. Once the required reflection line spacing FSR=$|y_m-y_{m\pm1}|$ is known, and any one required line position, if any, is known, $y_{m=1}=\frac{1}{2}n_aL_R$ is used to determine $L_R$. Then the $y_m=my_1$ that occur within the band of interest and the number of element types V required to span the band with an acceptably uniform optical density set of reflection peaks may be determined. For a 30 nm wide band at about 1.5 μm, one might require comb peaks spaced at 3.333 cm$^{-1}$; six element types V=6 are required to produce 32 significant comb lines. These reflection lines might be used in the initial step in the cascade demultiplexing of 64 frequencies in the order, 64, 32, 16, 8, 4, 2, 1 and as the final step in multiplexing frequencies in the reverse order.

To take dispersion into account one needs to consider the range of frequencies covered and select na appropriate to the center of the band. One can refine the peak positions from the effective index dispersion curves for the waveguide which depend on the material dispersion directly and indirectly. In most single mode waveguide cases the direct material dispersion is probably the dominant factor because the core index is only slightly different from that of the cladding. The dispersion of fused silica was used to estimate the shift in comb spectra for the filter described by Table 1. The minimum dispersion of silica is in the near IR, about $dn/d\lambda = -1.17 \times 10^{-5}$/nm, or $dn/dy = 2.8 \times 10^{-6}$ cm. The index of silica is about 1.46 while the index used in Tables 1–3 was 1.5. These dispersion values were used to calculate shift in peak positions of the peaks at $y_{m=1928}=6426.67$ cm$^{-1}$ and $y_{m=1940}=6466.67$ cm$^{-1}$ relative to the peak at $y_{m=1934}=6446.67$. The shifts are ±0.24 cm$^{-1}$, which is 7% of the theoretical FSR=3.33 cm$^{-1}$ and 22% of the theoretical peak width. This shift is negligible because imperfections in a mpm filter broaden the comb spectra considerably beyond the theoretical line widths.

The $s_v$ are determined by imposing the condition $n_v s_v = n_a L_R / V$. In the cases considered herein, $n_a = n_v$ for all v. A series of $M_v$ values, indicating the number of cycles in an element length $s_v$ is selected to appropriately space the significant $y_v$, v=1 to V, within the limits of the desired band. The $d_v$ are then calculated from $d_v = s_v/M_v$. The $\epsilon_m, \kappa_m, OD_m$ and half-widths $\Delta y_m$ of peaks are calculated using the coupled mode perturbation theory. The first filter is described by Table 1 and FIG. 7. Its comb spectrum does not span the full 30 nm band, but for the selected filter length, L=1 cm and modulation amplitude, it has a higher OD than the second filter which does span the entire band. The second and third filters, which do span the entire band, are described by Tables 2 and 3 and FIGS. 8 and 9. The third filter has a free spectral range which is twice that of the first and second filter, so it could be used to demultiplex a set of 32 lines demultiplexed from a set of 64 by the second filter. The optical density of the comb peaks of all these filters can be increased by increasing the index modulation amplitude Δn or the filter length $L=UL_R$.

A typical fiber for developing these filters may have a core diameter or mode field diameter (MFD) of 3 μm, a cladding index equal to the core index plus 0.005, and a numerical aperture NA=0.123. Fibers and phase gratings for developing filters for the 1550, 1300 and 980 nm bands are available (Bragg Photonics, Inc. and QPS Technology Inc.). Using an approach similar to the above, filters can be devised for the 1300 nm and 980 nm communication bands.

TABLE 1

Data Set D1

| m | 1920–1945 | $d_v$ (μm) | $s_v$ (μm) | $\lambda_v$ (μm) | $y_v$ (cm$^{-1}$) |
|---|---|---|---|---|---|
| $M_1$ | 482 | 0.51867 | 250 | 1.55602 | 6426.67 |
| $M_2$ | 483 | 0.51760 | 250 | 1.55280 | 6440.00 |
| $M_3$ | 484 | 0.51653 | 250 | 1.54959 | 6453.33 |
| $M_4$ | 485 | 0.51546 | 250 | 1.54639 | 6466.67 |
| V | 4 | | 1000 | | |
| U | 10 | | | | |
| Δε | 0.003 | | | | |
| $\epsilon_a$ | 2.25 | | | | |
| $n_a$ | 1.5 | | | | |
| Δn | 0.001 | | | | |
| $L_R$ | 1 mm. | | | | |
| L | 1 cm | | | | |
| FSR | 3.3333 cm$^{-1}$ | | | | |

TABLE 2

Data Set 2

| m | 1920–1968 | $d_v$ (μm) | $s_v$ (μm) | $\lambda_v$ (μm) | $y_v$ (cm$^{-1}$) |
|---|---|---|---|---|---|
| $M_1$ | 321 | 0.51921 | 166.67 | 1.55763 | 6420.00 |
| $M_2$ | 322 | 0.51760 | 166.67 | 1.55280 | 6440.00 |
| $M_3$ | 323 | 0.51600 | 166.67 | 1.54799 | 6460.00 |
| $M_4$ | 324 | 0.51440 | 166.67 | 1.54321 | 6480.00 |
| $M_5$ | 325 | 0.51282 | 166.67 | 1.53846 | 6500.00 |
| $M_6$ | 326 | 0.51125 | 166.67 | 1.53374 | 6520.00 |
| V | 6 | | 1000.00 | | |
| U | 10 | | | | |
| Δε | 0.003 | | | | |
| $\epsilon_a$ | 2.25 | | | | |
| $n_a$ | 1.5 | | | | |
| Δn | 0.001 | | | | |
| $L_R$ | 1 mm | | | | |
| L | 1 cm | | | | |
| FSR | 3.3333 cm$^{-1}$ | | | | |

TABLE 3

Data set 3

| m | 955–985 | $d_v$ (μm) | $s_v$ (μm) | $\lambda_v$ (μm) | $y_v$ (cm$^{-1}$) |
|---|---|---|---|---|---|
| $M_1$ | 192 | 0.52083 | 100 | 1.56250 | 6400.00 |
| $M_2$ | 193 | 0.51813 | 100 | 1.55440 | 6433.33 |
| $M_3$ | 194 | 0.51546 | 100 | 1.54639 | 6466.67 |
| $M_4$ | 195 | 0.51282 | 100 | 1.53846 | 6500.00 |
| $M_5$ | 196 | 0.51020 | 100 | 1.53061 | 6533.33 |
| V | 5 | | 500 | | |
| U | 20 | | | | |
| Δε | 0.003 | | | | |
| $\epsilon_a$ | 2.25 | | | | |
| $n_a$ | 1.5 | | | | |
| Δn | 0.001 | | | | |
| $L_R$ | 0.5 mm | | | | |
| L | 1 cm | | | | |
| FSR | 6.6666 cm$^{-1}$ | | | | |

In the above filter designs all filter elements have the same physical and optical length since $n_a$ is presumed to be constant and $M_v d_v = s_v$=constant. For similar commensurate thin film filters the order of modulated elements within $L_R$ makes no difference in the reflection spectrum (Land et al). This may or may not hold for a waveguide core. Consider the case that surface relief at the core boundary is used for modulation, which is fairly typical in planar waveguides used for integrated optical circuits. In that case, each filter element has the potential to reflect along the core or to diffract light into the cladding modes. An example is the cladding modes confined between a silicon substrate and planar waveguide surface. To reduce the amount of shorter wavelength light diffracted into the cladding modes serial stacks of modulated elements designed to form a broad band reflector are arranged with the smaller $d_v$ on the input side of the filter (ref Presby, p 202). The same approach is used with chirped waveguides of this type. The mpm can be similarly arranged but this would not be very effective, because like elements are necessarily distributed.

In a first consideration one may expect each of a multiply periodic series of lumped elements to couple independently to the cladding so that a broad reflection spectrum envelope of narrow comb peaks would lose energy to the cladding increasingly at the shorter wavelengths. However, because all $f_{u,v}$ with the same v interact with the guided light coherently, the coupling to cladding will be characteristic of the total coherent structure and not just the coupling characterizing each local element acting alone. Therefore if the comb peaks are sufficiently narrow and separated one should be able to design for coupling to be dominated by reflection within the core, diffraction to cladding, or by coupling to an adjacent waveguide as shown in FIGS. 5b and 6b. In such cases the order of elements within $L_R$ are immaterial if the filter has commensurate optical length elements f(u,v). Elements f(u,v) may of course be located systematically within a length $L_R$ so that light to be demulitplexed is incident on the filter end having the smallest $d_v$. Because the mpm filters are to be used for multiplexing and demultiplexing, it is well that they act symmetrically.

The m/d functions described by Hicks '849 use either a waveguide cavity or thin film cavity bound by dielectric mirrors, with an unspecified band width, to selectively transmit one frequency or possibly a set of frequencies, while reflecting the remaining frequencies back into the input trunk line. An output trunk line adjacent the input trunk line, as a result of folded codirectional coupling, continues the transmission of light reflected by the F-P filter. Frequency(ies) resonant in the F-P cavity are transmitted along a branch line. In any instance not using external optics, the F-P filter can be replaced by mpm within a waveguide core so that a single length of waveguide can comprise a trunk section, an mpm filter section and a branch section. In cases using external optics and a thin film resonant F-P cavity, the F-P cavity and mirrors can be replaced by an mpm thin film filter as described by Land et al. Mpm is intended to be used in a cascade mode so that the trunk line is m/d to two branches one of which is linked to the trunk directly through the mpm by direct transmission. The other branch is m/d with the trunk as a result of folded codirectional coupling of frequencies that are reflected by the mpm comb filter. The F-P cavities in Hicks FIGS. 2A, 3A, 3B, 4, 6A, 6B can therefore be replaced to provide m/d of the cascade type. The branches may m/d an equal or different number of carriers depending on the spectral width of the mpm comb filter envelope. Hicks FIGS. 2B and 2C and his related text and references explain folded codirectional coupling which is essential to the m/d operations using the indicated arrangements of components.

The extra function of providing pump light for amplification can be used as indicated by Hicks FIGS. 3A and 3B. Likewise, an arrangement analogous to that used to broaden an F-P resonance (Hicks FIG. 6C) can be used broaden mpm comb lines. The arrangement in Hicks FIG. 6D could also be used if one would replace the F-P by a mpm filter and tilt the mirror to allow the retransmission of the light reflected by the tilted mirror so that the light enters the intended fiber.

As noted above, F-P filters and multiply periodic filters are generally opposites with respect to transmission and reflection characteristics. An F-P filter characteristically transmits narrow lines containing less light than is reflected, whereas the opposite is true for mpm HTC filters. Features that may be similarly controlled include spacing and half widths of comb peaks, band width over which the filters operate and optical density. Mpm can also be used as mirrors for resonant cavities.

Fabrication of the Invention. HTC waveguide comb filters according to the invention can be fabricated using any process suitable to provide an otherwise uniform waveguide with a multiplicity of sequenced features, each having a less than a specified maximum reflectivity. Acting together these features cause cooperative coupling of selected propagating wave components from a broad continuous band resulting in a spectrum consisting of one or more sets of regularly spaced, more or less narrow, reflection lines. The waveguide may restrict propagation to one or two dimensions. The modulation may be approximately uniform across the one or two dimensions of a waveguide or the modulation within a waveguide may be less extensive than any of three dimensions of the guide. For example, regularly spaced notches or corrugations may be formed or etched in one interface of a guide or of a slab of dielectric material. Depressions may be back-filled with a solid or liquid or left as a gas-solid interface. Structures may be cemented or fused together, and waveguide components may include solids, gels, liquid or gas. Waveguiding may be accomplished by abrupt refractive index transitions or by a graded optical index. Conceptual examples of bulk and surface relief modulation and an analysis of wave coupling by interface modulation are given in the references (Boyd, p 337).

The most obvious waveguide media for the fabrication of HTC filters are silica optical fibers o and films which can be index modulated by exposure to spatially modulated UV light in the range 193 to 260 nm. Russell et al, supra, and Hill, supra, list lasers that have been used to write Bragg modulation into germanosilicate glass waveguides. The lasers include 20 ns pulse width KrF excimer using 193 or 248 nm, frequency doubled argon using 244 nm or 257 nm, quadrupled Nd:YAG or Nd:YLF using 261 nm and an excimer pumped dye laser pumping a frequency doubling crystal to produce tunable radiation between 243 and 250 nm.

The method most suitable for preparing HTC filters will depend on several factors, such as the extent to which at some place a beam from a light source adheres to an idealized configuration having a constant intensity, the temporal and spatial coherence lengths of the light, ratio of wavelength to the period $d_v$ of a filter element, the existence and thickness of waveguide cladding, the required comb peak free spectral range, the required ratio of comb peak half widths to the free spectral range, the signal discrimination requirements, the fabrication cost and the complexity versus performance requirements, the availability of suitable commercial equipment, and the number of identical items to be fabricated.

Interferometric Methods of Preparing mpm in Long HTC Filters. Assume that a nominally uniform intensity collimated beam of light is made to converge toward a straight section of waveguide as a result of encountering cylindrical optics. Most drawings to follow, FIGS. 10a, 10b 11a,11b, 12a,12b,13,14,15c,15d, include a representation of a central plane of converging rays. In most cases $\theta_i=0$ and the central plane rays are normal to the base of the drawings and to the waveguide axis when incident on the grating, prism or mask used to form crossed beams which imprint or induce development of periodic modulation in a waveguide.

The following presents various ways to use prismatic surfaces or diffraction gratings to provide standing optical wave interference patterns for imprinting modulation into or onto a waveguiding structure. In some cases the imprinting may result in a finished mpm hologram, or pre and post exposure processing may include holographic or lithographic preparation or development.

Figure 10A:
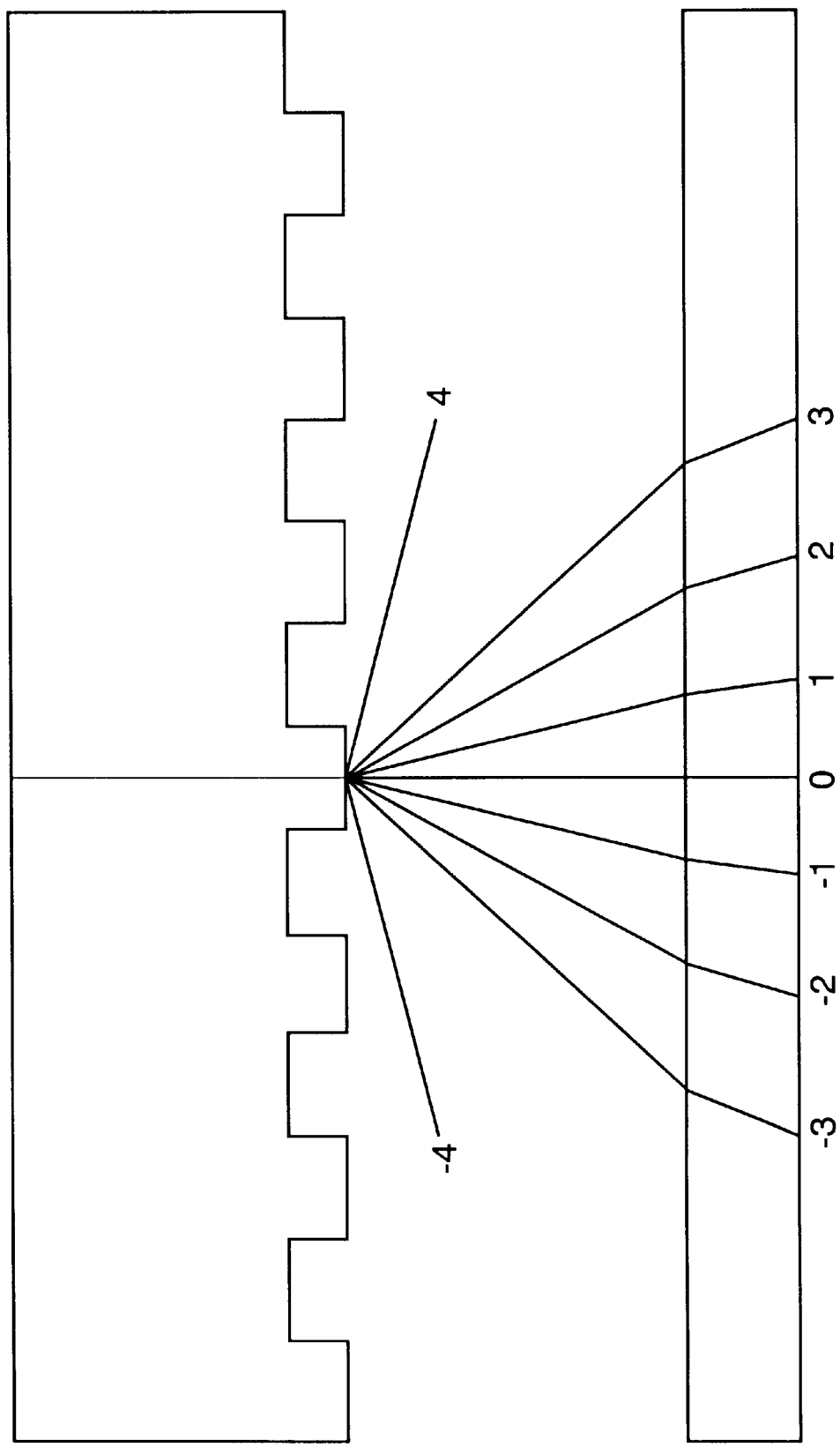
FIG. 10a illustrates the ray orders transmitted by a suppressed-zero-order phase grating with a period length, $\Lambda_1=2d_1$; $d_1$ is the period of the element with $v=1$ in Table 1. It is assumed that 250 nm curing light is normally incident on the phase grating. The zero order is suppressed by making the notch optical depth equal ½ the laser wavelength.
Figure 10B:
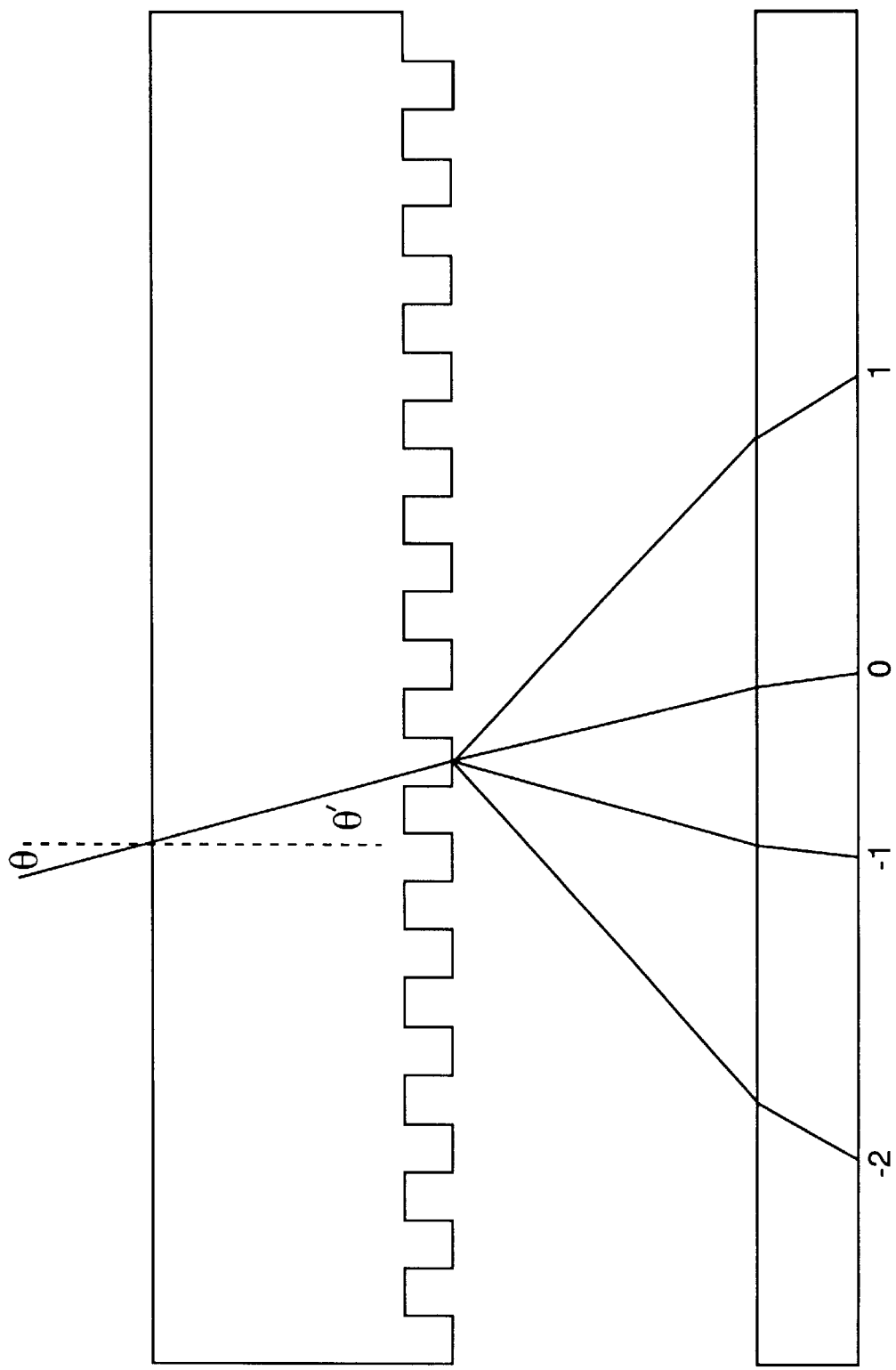
FIG. 10b illustrates the ray orders transmitted by a phase grating with a period length $\Lambda_1=d_1$. The incident ray $\theta_i$ and the transmitted zero order ray $\theta_o$ are required to make an angle with the vertical dashed line equal in size to the $-1$ order angle, $\theta_r=\theta_o=-\theta_{-1}$. Because total internal reflection limits the order number, the only unwanted rays are the +1 and −2 order rays which makes angle $\theta_1$ and $\theta_{-2}$ with the vertical. It is desirable that the zero order and −1 order intensities be equal and that the intensity of the 1 and −2 orders be minimized.

Phase gratings (phase masks) for providing standing wave patterns in the waveguides may include a suppressed zero order phase mask to be used with normally incident writing light. In this case transmitted light should be dominated by the first diffraction orders 1 and −1. An alternative is to use a grating with nonnormally incident light where the incident angle $\theta_i$ and the transmitted zero order angle $\theta_o$ are required to be equal or approximately equal in magnitude to the angle $\theta_{-1}$ of the $-\theta_1$ transmitted order. These two methods provide crossed primary beams for writing periodic modulation along a waveguide core as illustrated in FIGS. 10a and 10b. The pictured −1, 1 or −1, 0 symmetrically related diffraction angles correspond to the filter described in Table 1.

A multiply periodic spatial variation in the exposure of waveguide material to curing light may be accomplished in a single step through a multiply periodic phase mask (phase grating) or in multiple steps where either the structure providing the imprinting light pattern or the waveguide is translated and/or rotated between exposures. The first approach presumes that a multiply periodic phase grating has been prepared by a lithographic method using a rastered electron or ion beam. A multiply periodic grating may be used to write the desired modulation into one or more waveguides in a single exposure. In that case the primary diffraction orders −1, 1 (FIG. 10a) or 0,−1 (FIG. 10b) from adjacent grating elements will overlap to an extent determined by the distance between the grating and fiber core. The overlap regions form slightly slanted gratings with period lengths between the adjacent $d_\nu$ values, which will tend to broaden the comb spectrum of an mpm filter.

All transmitted orders other than the desired 1,−1 or 0,−1 contribute unwanted modulation or background, so measures to minimize transmission of unwanted orders are important. Gratings may be coated to limit transmission through portions of a grating surface period, and/or otherwise blazed to favorably bias the relative intensity of transmitted orders. A multiply periodic grating for this approach might be based on either FIG. 10a or 10b. The first transmits more unwanted orders. The second transmits fewer unwanted orders, which is desirable, but the conditions $|\theta_i|=|\theta_{-1}|$ for the incident parallel rays can be satisfied by only one grating element. When an intermediate $\theta_i$ is used, most modulation periods will be slightly changed in period length and slope from the design values. These differences can be taken into account in an original design.

In the following, more complicated arrangements are described that permit elimination of unwanted orders. However in most of those cases the requirements on laser uniformity with respect to intensity and coherence length are increased relative to that required when using a multiply periodic phase mask to imprint modulation.

Taking 250 nm as a typical writing wavelength one can structure a grating configuration to produce the filter described in data set one (Table 1) having V=4 and U=10. The first order diffractions 1 and −1 from a grating for suppressing zero order when exposed to normally incident light of a specific wavelength will write a pattern in an adjacent fiber with half the period of the grating $d_\nu=\Lambda_\nu/2$ (FIG. 10a). The grating periods needed to write the modulation are 1.03734, 1.03520, 1.03306 and 1.03092 μm. According to the grating equation, $$\sin\theta_m - \sin\theta_i = \frac{m\lambda}{\Lambda} \rightarrow \sin\theta_m = \frac{m\lambda}{\Lambda},$$

with m being a positive or negative integer, a grating having the spacing 1.03734 with curing light normally incident on the grating will transmit orders at angles ±θ equal to 0, 13.9456, 28.81, 46.3 and 74.78 degrees, into an air gap between the grating and waveguide. This situation is shown in FIG. 10a. The zero order is assumed suppressed. For v=1, the first order diffraction rays with θ=13.9456° are incident on the fiber core at $\theta'=\sin^{-1}(\sin\theta/n_a)=\sin^{-1}(\sin(13.9456/1.46)=9.501°$.

The multiple orders transmitted by even a single pitch grating develop a complex standing wave pattern. In some cases much of the modulation induced by the unwanted orders will produce spectral transmission and reflection features outside the optical band of interest. The interference patterns associated with all diffraction orders degrade with distance from the grating because of limited spatial and temporal coherence of the writing light. The patterns contributed by the higher diffraction orders degrade most rapidly. Regardless of the degree of degradation, the unwanted light may limit development of desired modulation by reducing the average amplitude and contrast of the desired modulation and by contributing to a change in the effective index $n_a$ toward a saturation value, thereby limiting the maximum modulation achievable with the desired pitch. Examples of calculated complex standing wave patterns in the space adjacent to a single pitch suppress zero order phase grating are illustrated by Dyer et al, supra.

If a continuous multiply periodic grating is used to write mpm there will be some overlap of first orders from adjacent grating elements. This will cause very slightly slanted modulation having a period between the $d_\nu$ periods of adjacent material in the fiber core. If the length of overlap is small compared to the length $s_\nu$ of the design, these slanted gratings are not anticipated to be a significant problem and tend only to broaden the spectral peaks slightly. The filter remains multiply periodic and the slant angle would not be sufficient to diffract light out of the fiber.

An alternative multiply periodic phase grating configuration to the one with suppressed zero order is a grating where the curing light is incident at an angle $\theta_i$ such that the incident and transmitted zero order angles $\theta_i=\theta_i=\theta_o$ are equal to the negative of the first order diffraction angle $\theta_{-1}$. As illustrated in FIG. 10b, this condition imposes a grating spacing $\Lambda_\nu=d_\nu$ for the filter described in Table 1, and results in only four transmitted orders m=0, 1, −1 and −2 according to the above grating diffraction equation. Larger + and − orders are suppressed by total internal reflection. The angles $\theta_i=\theta_o=-\theta_{-1}$ and $\theta_1=-\theta_{-2}$ in air are, respectively, 13.9456° and 46.3° for the case $\Lambda_1=d_1=0.51867$ μm, when $n_a=1.46$ and $\lambda_o=250$ nm. The corresponding angles inside the silica grating device and silica fiber are 9.53465° and 29.68°. The symmetrically related crossed rays write the modulation at the intended zero slant angle, that is, with planes of equal index normal to the fiber axis. One has the desired pitch and the other has a pitch that will not reflect light in the wavelength range of interest. The crossed orders (0 and 1), (−1 and −2), and (0 and −2), (−1, 1) will write slanted modulation in the fiber core. The latter two pair will write a substantially higher pitch than do the desired crossed orders 0 and −1, so this modulation clearly will not reflect light in the band of interest. The modulation written by adjacent crossed orders 0, 1 and −1, −2 has a greater spacing of planes of constant index than the desired spacing $d_1$, so there is a possibility that this modulation could reflect light within the band of interest. The angle in the fiber core between grating transmitted orders −1 and −2 is $$\alpha_{-1,-2} = (\theta'_2 - \theta'_1)/2 = 20.145°$$

The separation of equal index planes is then, $$d_{-1,-2} = \lambda_o/2n_a \sin(\alpha_{-1,-2}/2) = 250 \text{ nm}/2/1.46/0.1749 = 489.5 \text{ nm}$$

The angle between the desired modulation planes with pitch $d_1$ and the planes with pitch $$d_{-1,-2} \text{ is } -(\theta'_1 + \theta'_2)/2 = -19.608°$$

The first order wavelength that would be reflected coherently by this modulation is $$\lambda_o = 2n_a d_{-1,-2} \cos(19.6089) = 2*1.46*489.5*0.942 = 1346 \text{ nm}$$

This wavelength is outside the band of interest, viz the 1550 nm band. It appears therefore that the unwanted modulation associated with unwanted orders from a multiply periodic grating of the sort discussed in this paragraph would contribute to the change in effective index thereby contributing to limiting the maximum modulation amplitude with the desired pitch, but would not significantly modulate the waveguide reflection and transmission spectrum within the spectral range of interest.

The standing waves associated with nonsymmetrically related diffracted light will have traveled paths of different length before reaching the waveguide so the standing wave contrast tends to degrade faster as a result of laser band width than does symmetrically related rays for a given separation q between the grating and waveguide.

As indicated in FIG. 10b, ideally each grating element of a multiply periodic grating should have a different beam angle of incidence $\theta_{i,v}$ to avoid writing slanted modulation. This is probably not practical. The alternative is to use a compromise angle of incidence so that some modulation has slant angles slightly different from the desired direction. The slant angles can then be taken into account by making the commensurate requirement include the cosine of the predicted slant angle.

The ideal incident angles for the case illustrated in Table 1 are calculated using, $$\theta_{-1,v} = \theta_{i,v} = \arcsin(\lambda/2d_v)$$

This yields $\theta_{i,v=1,4}$ as 13.945°, 13.975°, 14.005° and 14.034°. Taking $\theta_i$ as 13.990° for all grating elements yields $|\theta_{-1,v}|$ as 13.9013°, 13.9601°, 14.0192°, 14.0785°. The differences of $|\theta_{-1,v}|$ from a compromise incident and transmitted angle $\theta_i = \theta_o = 13.990°$ are −0.089°, −0.030°, 0.029° and 0.088°. The filter can be designed and structured to compensate for some modulation being slanted.

The relative amplitude and intensity of the orders transmitted by phase gratings depends on many details including polarization of the incident radiation, depth of groves, relative length of the notches to space between notches in a grating and shape of the grating notches. The objective in making either a grating with suppressed zero order for use with normally incident radiation, or in making a grating that provides $\theta'_o = -\theta'_{-1}$ is to minimize undesired fiber core modulation and changes in effective index by reducing the amplitudes of unwanted orders relative to desired orders.

The closer the grating is to the core when imprinting the core the less dependent the modulation is on the temporal and spatial coherence of the beam incident on the grating. The modulation complexity depends on the number of transmitted orders and relative intensity of transmitted orders. A simple consideration is that the modulation created by any ray pair is perpendicular to the bisector of the ray pair, and the modulation period d decreases as the angle between ray pairs increases toward 180°. The modulation by symmetrically related rays is described by $d_m = \Lambda/2m$ when the writing light is normally incident on the grating, where the integer m indicates the diffraction order. Most of the modulation induced by unwanted rays will not reflect light within the band of interest if $d_1$ is the period of interest, but it will contribute to the local effective index, thus potentially limiting the maximum amplitude of the desired modulation. The superposition of unwanted rays also caused a continuous local variation in the effective index within each period $L_R$, which will cause broadening of comb reflection peaks.

Consider the grating configuration shown in FIG. 10a as being used to imprint a waveguide and that the modulation is induced by surface damage to the core of a silica fiber waveguide. The peak intensity resulting from superposition of first and second order rays has the period A, so the dominant modulation periods are $d_v = \Lambda_v$ rather than $d_v = 2\Lambda_v$. See Dyer et al, supra, for an explanation of damage.

Dyer also shows how a radiation field varies with distance from a grating. The variation suggests that one might optimize the separation of grating and waveguide core to reduce the variation of writing intensity caused by multiple orders to a minimum, thus reducing the variation in local effective index with only modest reduction in the amplitude of the desired modulation.

Fixed-Position Near-Contact Imprinting Of Modulation Using Multiply Periodic Gratings. In the following examples where light rays are drawn or indicated as being incident on a waveguide to induce index modulation by interference or by focusing the image of a slit array (grating), there is a presumption of rays converging toward a straight section of waveguide material (a waveguide core or material adjacent a core). The convergence is considered a result of focusing by a cylindrical lens not included in most drawings. Rays shown in the drawings are considered to be in a plane cut where the rays from a laser are normally incident with respect to the base of the beam modifying device or assembly used to direct the rays, or possibly incident at the angle $\theta_i$ in those cases where a grating with $\Lambda = d_v$ might be optionally used to produce diffracted rays. If the cylindrical lens were the nearest element to a grating or prism the illustrated cut planes would cut the center of the lens.

Notwithstanding the problem with multiple orders discussed above, useful multiply periodic filters in waveguides may be made by using a multiply periodic grating of either type $\Lambda_v = 2d_v$ or $\Lambda_v = d_v$ as discussed in relation to FIGS. 10a and 10b above to essentially contact print any of several types of desired multiply periodic patterns to be used as printed or further developed holographically or lithographically. Use of a multiply periodic phase grating to develop multiply periodic filters in waveguides is therefore considered a preferred fabrication method of the invention.

Since modulation in optical fibers is typically written through the cladding, the minimum separation of a multiply periodic grating and the fiber core is limited and can be used to determine the minimum length of a slanted grating that would be developed between filter elements produced by a multiply periodic phase grating with zero order suppressed.

Taking as an example a fiber with cladding thickness 62 μm and grating with element period length $\Lambda_1$=1037.34 nm, corresponding to $\Lambda_1$=2$d_1$ of Tables 1 and 4, and a normally incident writing wavelength of 250 nm, the first order rays exit a grating into air at 13.94 with respect to the grating normal. If the grating is essentially in contact with the cladding and the cladding has an index of 1.46 the incident beam crossing angle is reduces within the fiber from about 13.94° to 9.501°. The maximum separation of grating locations that contribute to interference of first order rays at a point on the optical fiber, according to ray tracing, is then about 2×62 sin 9.5° μm≈20.4 μm. This is also the length of the slanted modulation between filter elements and the minimum laser beam spatial coherence length required to avoid significant loss of first order modulation contrast.

Uniform beam intensity is important. Variations in beam integrated writing energy will cause variations from a desired average index $n_a$ in the fiber core for the entire length of the filter, reducing or destroying the coherence of reflections from like elements increasingly with element separation. Nonuniform intensity will be more detrimental to filter performance than a short coherence length when using a multiply periodic phase grating, since keeping the grating to core distance small can reduce the required coherence length for the laser light. Other important factors include waveguide material uniformity and waveguide dimensions, and the temperature dependence of relevant material properties.

Near Contact Imprinting of Modulation in Waveguides Using Segmented Plane Gratings and Relative Translations Between Exposures. An alternative to fixed position imprinting through a complete multiply periodic plane grating is use of a less than complete grating and to reposition the grating or waveguide between exposures. Various examples are presented in the following where the waveguide is placed immediately adjacent the phase grating.

One option is to have the grating consist of one major period length $L_R$ and arrange for accurate translation of the waveguide between exposures to generate U identical major periods. This may have advantages related to deficiencies in beam spatial intensity uniformity and optics uniformity and may provide an improved likeness of major periods $L_R$. Disadvantages relative to using a complete mpm phase mask include added complexity and the possibility of inaccurate translations resulting in reduced coherence among the $L_R$ length segments.

A similar and probably superior alternative is to prepare a phase mask consisting of V offset units each consisting of U sectored identical grating elements with minor period length $\Lambda_v$ periodically spaced at a distance $L_R$. The length of the grating elements could be longer than in a multiply periodic grating, that is, the grating could have more periods than $M_v$ in a grating element. This arrangement could eliminate apodization and blanks between imprinted waveguide portions. The offsets distances could be equal to $L_R$ in the periodic (z) direction. Displacements between imprinting could be lateral or angular. The simplest and most practical arrangement would likely be to translate a plane grating array laterally to the waveguide direction between exposures while keeping the waveguide, light source and optics fixed. Optical interference monitoring and small displacement corrections might be necessary to achieve precise imprinting at each step. Successive displacements of the grating or waveguide and V exposures would be used to imprint an mpm in a waveguide or an array of parallel waveguides. This arrangement could use the grating arrangement of FIG. 10a or 10b. To avoid the development of slanted modulation by the symmetrically related diffracted beams, use of FIG. 10b would require a change in $\theta_i$ with each of V relative translations of the waveguide or grating. However, slanted gratings would permit the use a fixed angle of incidence for all exposures.

Imprinting Arrangements to Reduce or Eliminate Modulation by Unwanted Orders. Fabrication may also be accomplished by providing elements of a writing control device, such as a set of precision ground prism facet pairs or grating pairs, at locations separated from one another and from the waveguide such that each pair exposes a section of waveguide through a precisely located and sized slit located immediately adjacent the optical waveguide. Devices of this type are illustrated schematically in FIGS. 11a, 11b, 12a and 12b. The light in this central plane cut is presumed incident normal to the beam forming fixtures with respect to the base of drawings and cylindrically focused at the waveguide core. The light depicted in the plane cuts consists of that incident on the fixtures, and narrow bands of parallel rays which pass through slits or gratings in the top surface, not shown explicitly, and arrive at the slits $S_u$ (FIGS. 11a,11b) or $S_v$ (FIGS. 12a,12b). The incident light is not shown in FIGS. 12a and 12b but is the same as in FIGS. 11a and 11b. Exposures are done repeatedly, each exposure following a relative position shift between the device and waveguide. The main advantage of this procedure is that no multiple orders exist if prisms are used, and the amount of zero order and higher than first order light reaching the waveguide is reduced when gratings are used. This prevents development of undesired modulation, including the slanted gratings mentioned above as occurring because of the interaction of first order light diffracted by adjacent phase grating elements having a slightly different pitch. Expected results are filter development nearer to the ideal situation, single local pitch and larger and more uniform modulation amplitude than would be possible using a multiply periodic phase mask immediately adjacent a waveguide. By tracing rays back from a slot $S_u$ or $S_v$ to a prism surface or grating element one can observe the initial spacing between incident parallel rays that converge to a slit. The wider the spacing the more stringent the requirement for laser beam coherence.

The vertical dashed lines at the edges of FIGS. 11a, 11b, 12a and 12b are intended to show that the devices might consist of a solid piece of optical material such as fused silica, having a shape different from that indicated by the dashed line, which could aid in the disposal of any light reflected from the surface surrounding slots $S_v$, and to indicate the possibility that the structure may consist of more than one antireflection coated optical component separated by an air gap and a low expansion supporting structure. Use of reflecting rather than absorbing material between slits minimizes thermally induced changes in apparatus dimension and optical index.

Figure 11A:
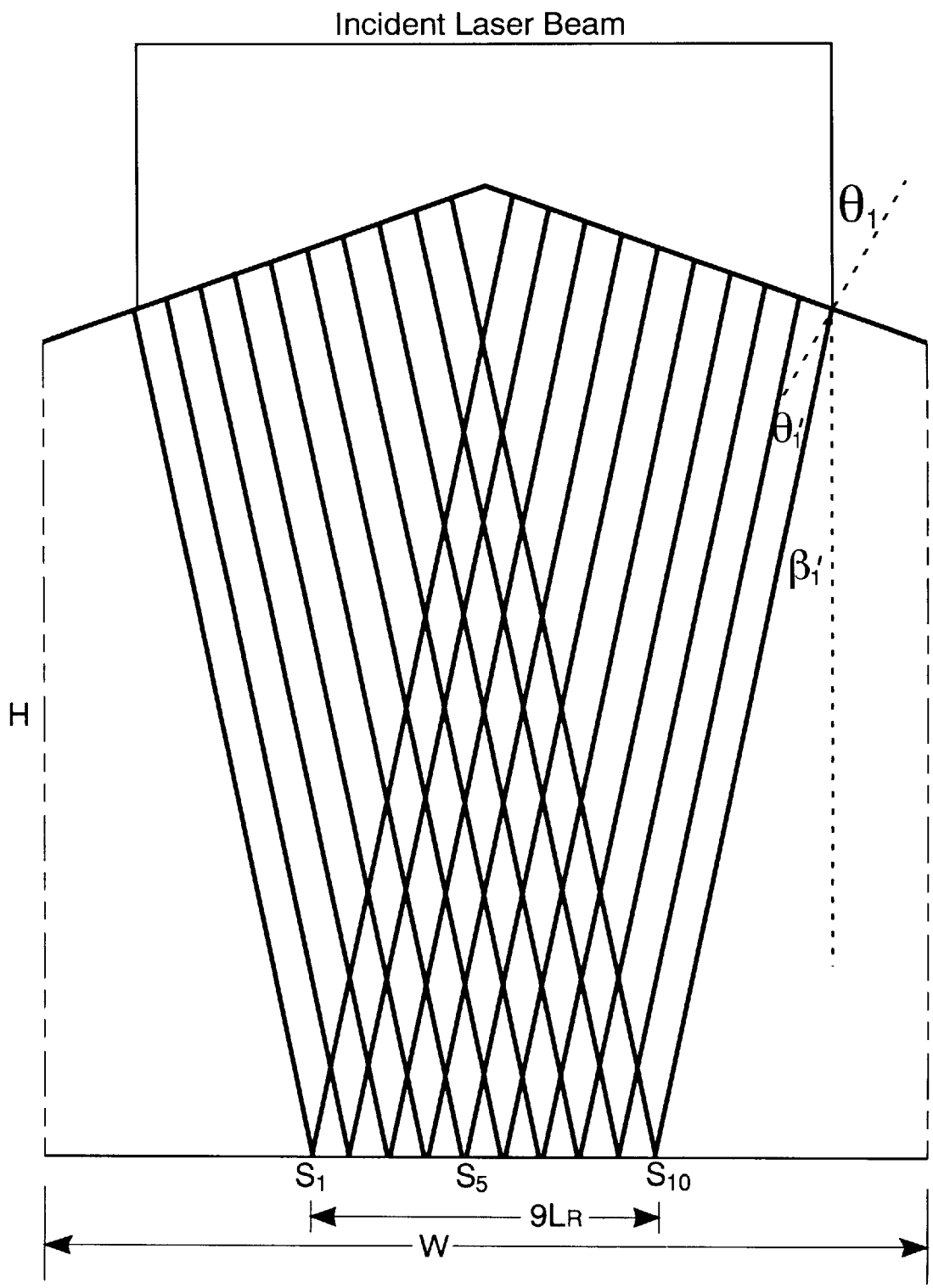
FIG. 11a shows in section a silica prism with top faces sloped to provide interferometric photoimprinting of v=1 type modulation of Table 1 in a waveguide. The waveguide is placed adjacent to U=10 equally spaced slits $S_u$ in an opaque reflecting film which limit extent of waveguide exposure. The top surface is partially coated with an opaque reflective film to prevent transmission of rays other than those directed to a slot in the lower film. The prism can be ganged together with similar prisms, and with suitable positioning of the prisms and the waveguide between exposures the desired mpm can be imprinted or developed in the waveguide core.
Figure 11B:
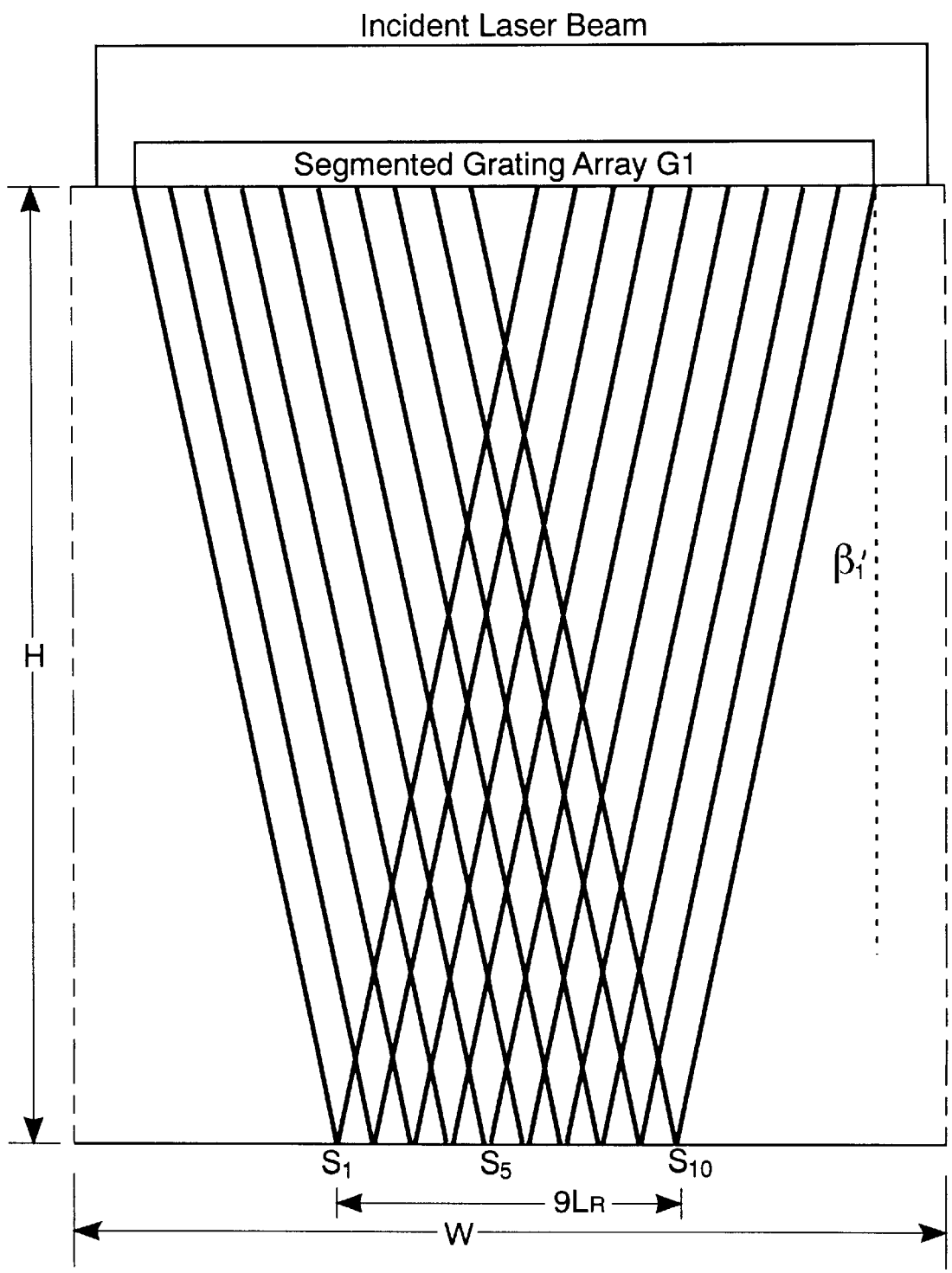
FIG. 11b shows in section a silica block containing U=10 identical grating elements placed to provide interferometric photoimprinting of v=1 type modulation of Table 1 in a waveguide. The waveguide is placed adjacent to U=10 equally spaced slits Su, u=1 to 10, in an opaque reflecting film. The top surface is coated between grating elements with an opaque reflecting film. The block can be ganged with similar blocks, and with suitable positioning of the blocks and the waveguide between exposures the desired mpm can be imprinted or developed in the waveguide core.
Figure 12A:
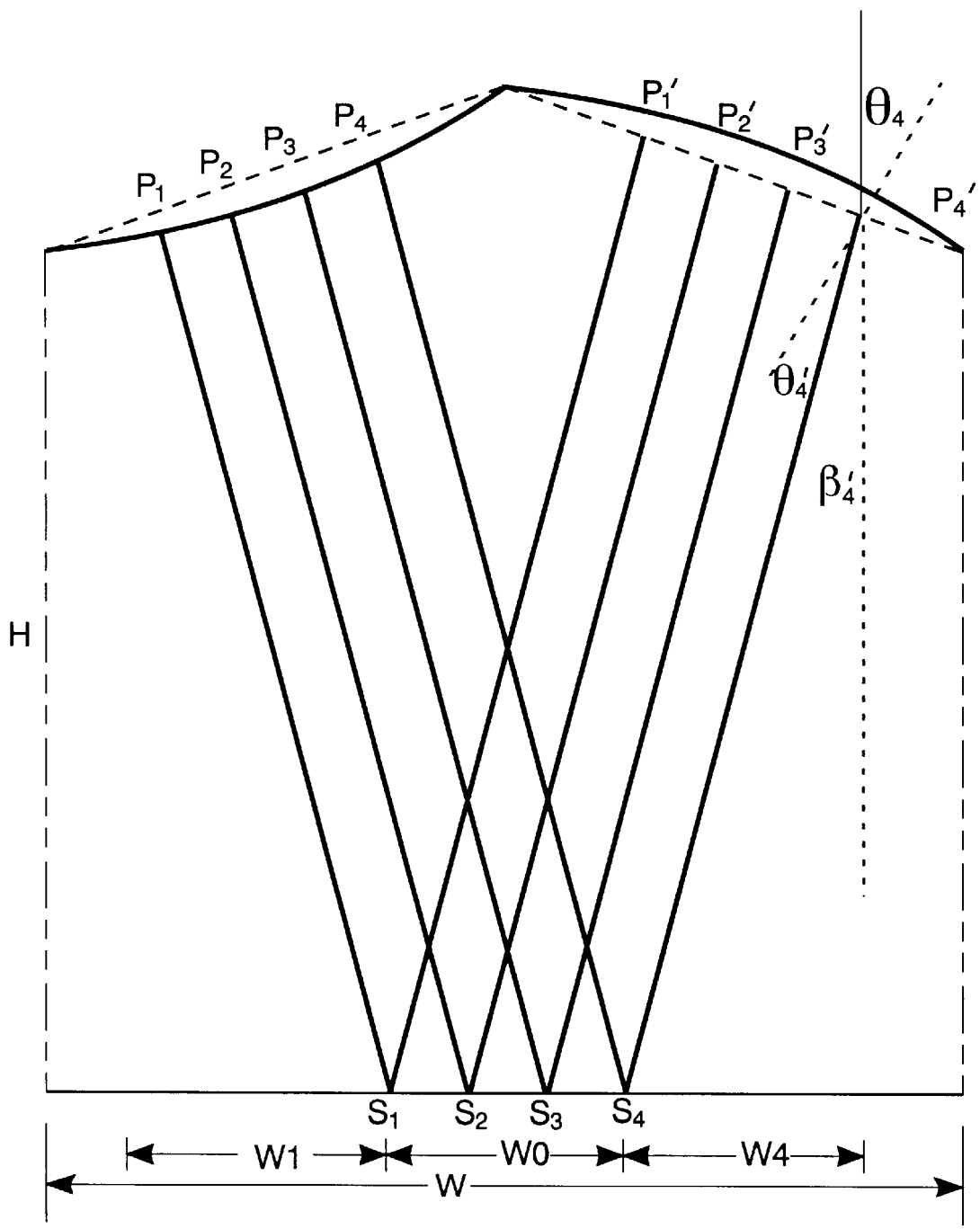
FIG. 12a illustrates a cross section of a modified silica prism with matched convex and concave surfaces which locally approximate prism facets $P_v$ and $P'_v$ polished at angles suitable to provide the crossed beams necessary to write one of U required sets of the $s_v$ length modulation elements of Table 1 into an optical waveguide to be placed adjacent to the slits $S_v$ in an otherwise opaque reflective film. The lines traversing the prism represent rays of laser light. The angles $\pm\beta'_4$ are the angles with the vertical inside the silica prism and doped silica waveguide core made by the rays needed to write the modulation elements with length $s_4=M_4d_4$ listed in Table 1.
Figure 12B:
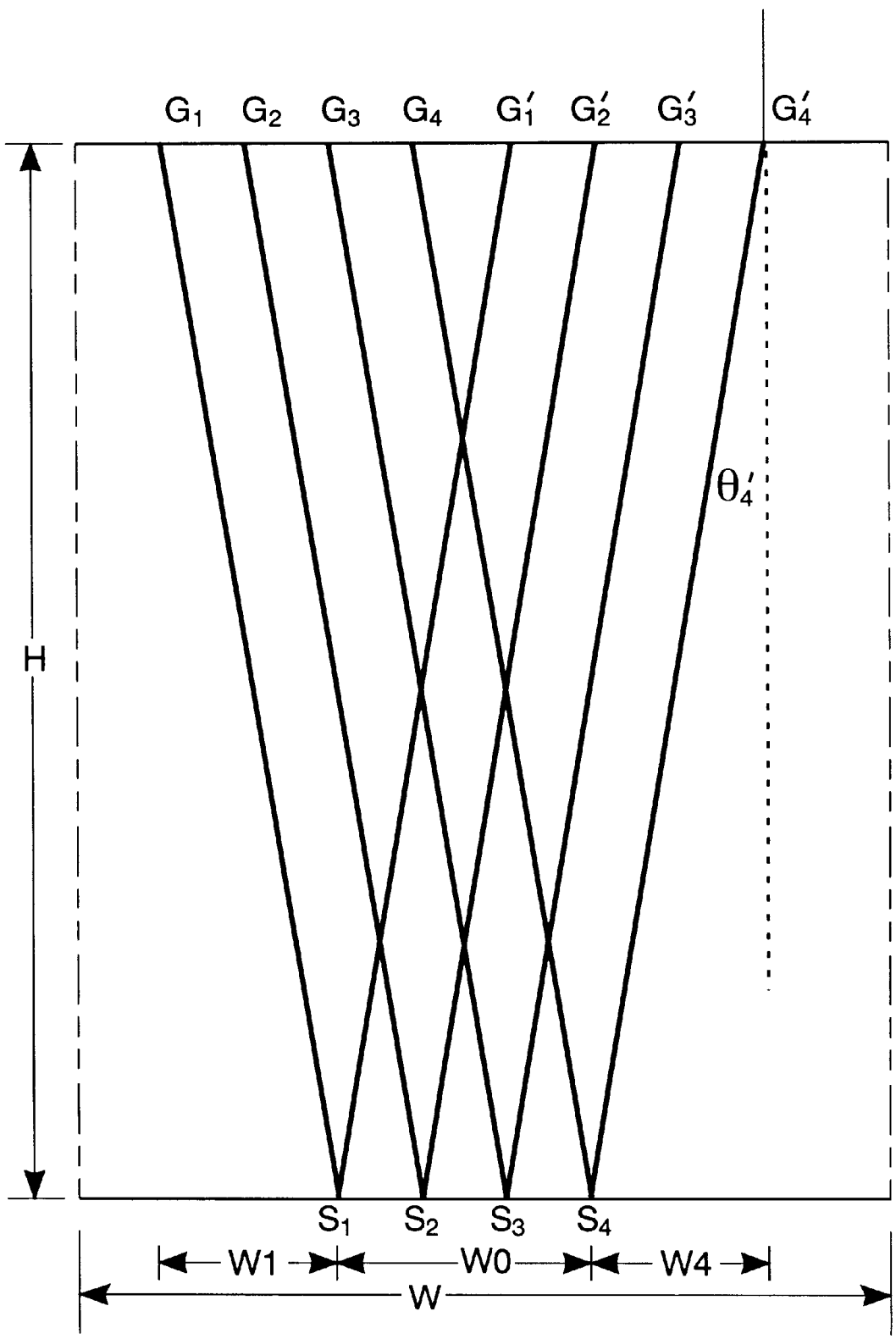
FIG. 12b shows in section a silica body having on the top surface a series of grating elements $G_v$ and $G'_v$, v=1 to 4, designed to cause transmitted first order rays to fill the indicated slits $S_v$ in an opaque reflective surface and cross within an adjacent silica waveguide core at angles $\theta'_{v,1}$ and $\theta'_{v,-1}$, v=1,4. Each ray pair that crosses within the waveguide provides for writing one of U sets of modulation elements $s_v$, v=1,4, listed in Table 1. The surface between grating elements is coated with opaque reflecting film. The grating elements may be separated so that zero order transmission will miss the slots $S_v$, but the zero order transmission of the grating elements is presumed to be suppressed.

The prism and the U grating elements G(x)=G(x+$L_R$) arrangements shown in FIGS. 11a, 11b represent one of V such devices which might be ganged together with appropriately offset prisms or gratings and slits. Successive relative displacements and exposures are required to provide multiply periodic imprinting of a waveguide. Displacements may involve translation or angular motion depending on the structure of the beam forming device. The desired rays incident on slits in FIGS. 11a and 11b comprise 20 ray bands. The width of ray bands incident on a waveguide section can be limited by applying an opaque reflective coating to portions of the upper end surfaces. In that case the upper slits would be somewhat wider than the lower slits and the lower slits would be somewhat wider than the lengths $s_v$, to avoid apodization of and gaps in the index modulation.

FIG. 12a illustrates multiple refracting prismatic facets forming the desired crossed beams. Ideally each half of the upper surface of FIG. 12a includes V prismatic surfaces ground and polished optically flat at the required angles and having widths somewhat larger than $L_R$ considering the angles between the facets and the waveguide axis. The central portion of each facet directs a ray bundle to a slit $S_v$. This might be practical if the center of all facets would match to a convex surface approximately. However, since the slope of nominal facets $P_v$ and $P'_v$ are equal in magnitude but opposite in sign, one half of the desired prism facet array is approximated by a concave surface and the other by a convex surface. Therefore, the most practical approach is to prepare concave and convex surfaces as indicated, which will provide approximately the ideally desired converging ray patterns at the waveguide. The curvature of cylindrical surfaces in FIG. 12a is exaggerated in the drawing in order to be visualized. FIG. 12b contains a grating array $G_v$, $G'_v$, v=1,V, which is situated to diffract first order transmission from grating pairs to slots $S_v$. The areas between grating elements are coated with an opaque reflector to prevent transmission of unwanted light. The grating elements would be structured to suppress zero order.

Figure 13:
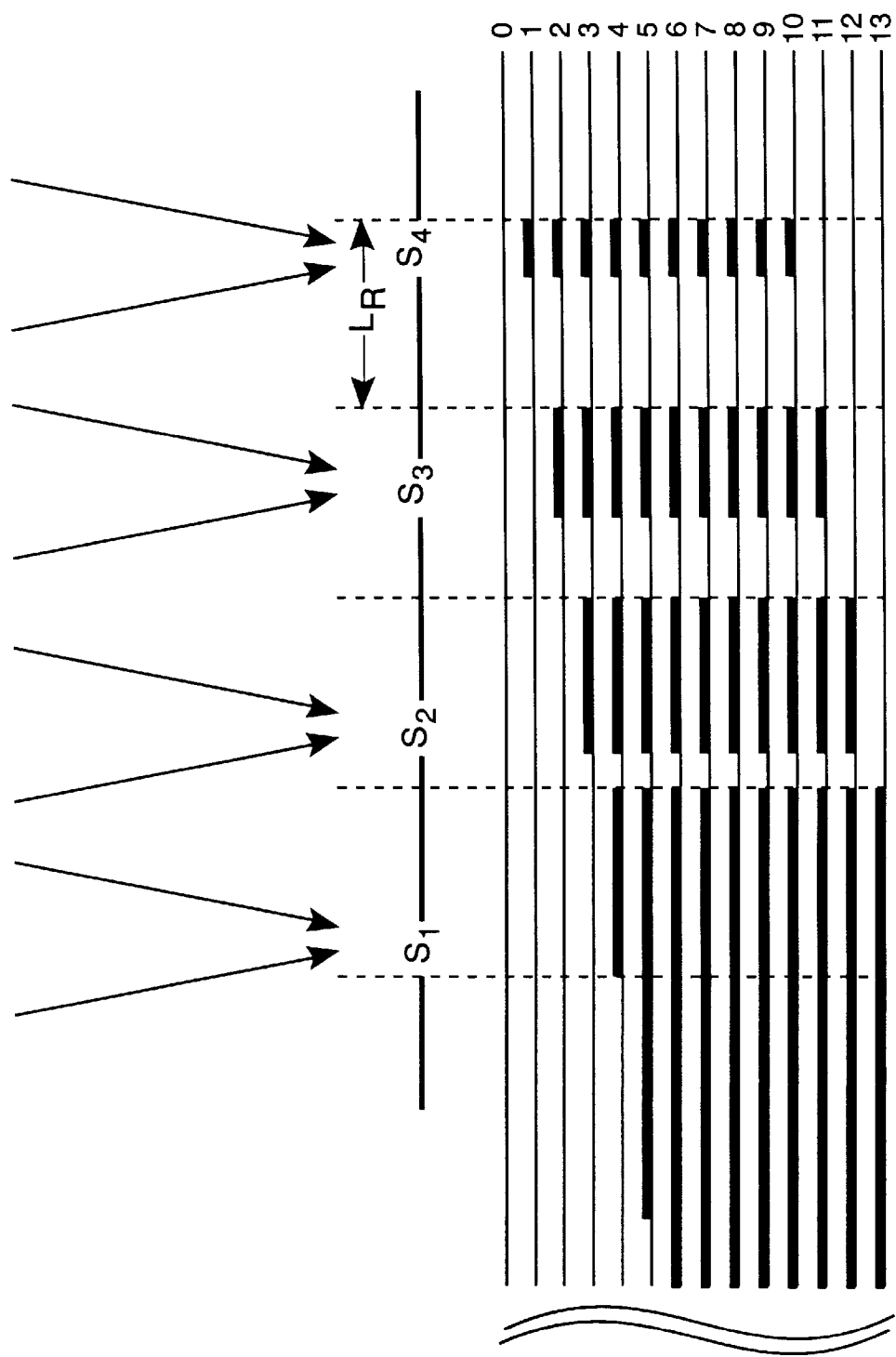
FIG. 13 illustrates one proposed method of creating a multiply periodic filter with V=4, U=10 corresponding to the filter design described in Table 1. The waveguide is modulated by a sequence of exposures of the type illustrated by FIG. 12a or 12b, where each exposure precedes or follows an accurate translation of the waveguide by a distance $L_R$. Portions of the incident beam are to be blocked during the first three and final three exposures. The thick lines represent regions of the waveguide that have been exposed to the crossed light rays following a displacement toward the left.

FIG. 13 illustrates how a single structure like those in FIG. 12a or 12b might be applied to develop the filter described in Table 1. At the top of FIG. 12a, $P_1$, $P_2$, $P_3$, $P_4$, $P'_1$, $P'_2$, $P'_3$ and $P'_4$ represent nominally sets of paired rectangular prismatic facets polished optically flat at angles $\pm\theta_v$, v=1–4, with respect to the horizontal base of a block of fused $SiO_2$. $S_1$, $S_2$, $S_3$, $S_4$ at the bottom of FIGS. 12a and 12b and occurring in FIG. 13 represent windows or slits in an opaque reflective film which permit selective exposure of a waveguide adjacent to the slits. Portions of prismatic facets (convex and concave surfaces) not contributing to the light incident on a transmission slit $S_v$ may be made opaque and reflective. The top of FIG. 12b represents a series of gratings which provide that the desired diffraction orders −1 and +1 be incident on the slits $S_v$, v=1,4. The indicated height H and width W can be varied within limits that permit light transmitted by a facet pair or grating pair to enter the intended transparent slot in an otherwise reflective base. That is, H≈(W0+LG)/2 tan $\beta'_4$ and H≧$2L_R$/tan $\beta'_4$ where LG≧$L_R$ is the length separating centers of grating elements $G_4$ and $G'_1$. The width W>W1+W0+W4+LG>$8L_R$. Thus the minimum height H would be about 5.7 mm and the minimum width would be about 8 mm for a fixture to make the filter of Table 1.

Factors affecting the choice of H in FIGS. 11a, 11b, 12a and 12b are the coherence length and intensity uniformity of the incident laser light, the minimization of transmission of unwanted orders by the windows $S_v$ and a minimum practical thickness H related to fabrication and handling in those cases where $S_v$ and $L_R$ are small. Because the slot widths $S_v$ are substantially smaller than $L_R$, only the central portions of the curved surface approximating a prism facet needs to be accurately sloped. Likewise, only the central part of each segment of length $L_R$ needs to be occupied by a grating element $G_v$. The remaining surface can be coated to reflect incident light.

In order for the arrangements of FIGS. 11a, 11b, 12a, 12b to be suitable, the light rays incident on a prism pair, such as $P_1$ and $P'_1$, or grating pair $G_1$ and $G'_1$ must be sufficiently coherent. Consider, for example, the normally incident rays from the laser to be collimated in the cut plane. The coherence length along the incident wave front is limited by the laser light spectral width and any divergence from the ideal cylindrical wavefront geometry. The prismatic facet pairs are not symmetrically located so that the ray paths originating along the incident plane wave front are unequal when traced to a slit $S_v$. Variations in the incident wavefront from the desired geometry together with the frequency band width of the laser light cause a variation from an ideal standing wave in the waveguide core because of a spread in the k-vector direction and magnitude. In the case shown in FIGS. 12a and 12b the coherence length of the incident beam should be 0.6 mm or greater because of the separation of facet pairs and difference in ray path lengths and about 0.5 mm or greater because of the separation of grating elements. These coherence lengths can be achieved for most lasers except for some excimer lasers. Acceptable coherence lengths are shorter in the case of the grating device since the symmetrically related ray path lengths from a normally incident cylindrical wave for a transmitted first order ray pair on reaching the center of a slot are equal. The coherence length requirements are obviously greatest for the arrangement of FIG. 11a, assuming the FIG. 11b arrangement to be developed to the same scale, because of the largest separation of incident ray pairs converging to a given slit, and because of the path length differences of these ray pairs.

Assuming light normally incident onto a prism or grating array, with zero orders suppressed, the crossed beams are at angles $\pm\beta'_v$ or $\pm\theta'_v$, respectively, with respect to the vertical within the silica block and cause the development of vertical planes of constant index within a horizontally oriented fiber waveguide core when the waveguide is placed adjacent the transparent slots in the silica block. Both the silica block and waveguide core are considered to have a nominal refractive index of 1.46. The angles in FIGS. 12a suitable for developing the filter described in Table 1 are recorded in Table 4 in accordance with the assumption that the recording wavelength is λ=250 nm and the index of fused silica is 1.46. The angles $\theta'_{-1,v}$ in FIG. 12b are equal to the $\beta'_v$ in FIG. 12a.

TABLE 4

|  | $d_v$ | $\beta_v'$ (rad) | $\beta_v'$ (°) | $\theta_v$ (rad) | $\theta_v$ (°) | Sin ($\theta_v$) | n * Sin ($\theta_v - \theta'_v$) | $\beta'_v$ (rad) |
| --- | --- | --- | --- | --- | --- | --- | --- | --- |
| v = 1 | 0.51867 | 0.16583 | 9.50125 | 0.50113 | 28.712 | 0.48041 | 0.48041 | 0.33530 |
| v = 2 | 0.51760 | 0.16617 | 9.52108 | 0.50208 | 28.767 | 0.48125 | 0.48125 | 0.33590 |
| v = 3 | 0.51653 | 0.16652 | 9.54099 | 0.50303 | 28.822 | 0.48208 | 0.48208 | 0.33651 |
| v = 4 | 0.51546 | 0.16687 | 9.56098 | 0.50399 | 28.876 | 0.48292 | 0.48292 | 0.33712 |

The faces of FIG. 12a need to be curved to provide local slopes as indicated in Table 4. The radius of curvature needed are approximately ±144 mm and the arc lengths are about 5.2 mm, to provide interference patterns with periods $d_1$, $d_2$, $d_3$, $d_4$ in the waveguide core lying adjacent slots $S_1$, $S_2$, $S_3$ and $S_4$ in an opaque reflective coating. Slot widths $S_v$ of FIGS. 12a and 12b and FIG. 13 are slightly greater than $s_v$=250 μm with v=1 to 4, respectively. The relative location of the initial edges of slots, beginning from the left is approximately 0, $L_R+s_1$, $2L_R+s_1+s_2$, $3L_R+s_1+s_2+s_3$. The exact slit widths and locations may be optimized in accordance with the distance between the slits and the waveguide core.

To produce a multiply periodic waveguide with a partial set of crossed beams, a sequence of exposures is required. If U elements of the type shown in FIGS. 12a and 12b are available and properly offset laterally and/or by angle the desired pattern can be imprinted by U exposures. If however the imprinting is done using a single fixture element as shown in FIGS. 12a and 12b, the process is more involved. This process is illustrated in FIG. 13, where thickened lines indicate sections of exposed waveguide. An initial exposure is accomplished through slit $S_4$ while blocking light incident on prism facets $P_1$, $P_2$, $P_3$, $P_1'$, $P_2$ and $P_3'$ or the corresponding $G_v$ and $G'_v$. A second exposure is similarly accomplished through slits $S_3$ and $S_4$ after the waveguide or a set of waveguides is translated to the left a distance $L_R$. A third exposure is done through slits $S_2$, $S_3$ and $S_4$ after another $L_R$ translation. Of the remaining exposures all but the final three exposures are made through all slits. The final three would be made through $S_1$, $S_2$ and $S_3$, then through $S_1$ and $S_2$ and finally through $S_1$ alone, where between exposures the waveguide or waveguide set is translated accurately through distance $L_R$ by fringe counting. Thus U+V−1=13 translations of length $L_R$ are required to imprint the filter with V=4 and U=10 described in Table 1.

The structure required in the above process must be accurately fabricated and the orientation and relative positions of the beam forming device and fiber for each exposure must be accurate. The advantage of the slightly curved facet fixture in FIG. 12a is that light is refracted in one nominal direction only for each nominal facet whereas the gratings will transmit multiple orders. Limiting the length of gratings $G_v$ and $G'_v$ and judicious choice of H may be used to reduce the amount of light of unwanted orders reaching the waveguide.

The gratings of FIGS. 11b and 12b may be the suppressed zero order type with curing light normally incident, or the type where $\theta_o=\theta_i=-\theta_{-1}$ where the angle is selected to correspond to an element with an intermediate period length. As discussed above, the latter will produce slightly slanted modulation in those elements for which $\theta_i=+\theta_o \neq |\theta_{-1}|$. The grating element lengths or positions require some adjustment to provide that the beams intercept the slit correctly. The advantage is that fewer unwanted orders need to be prevented from illuminating the slots $S_v$.

Figure 14:
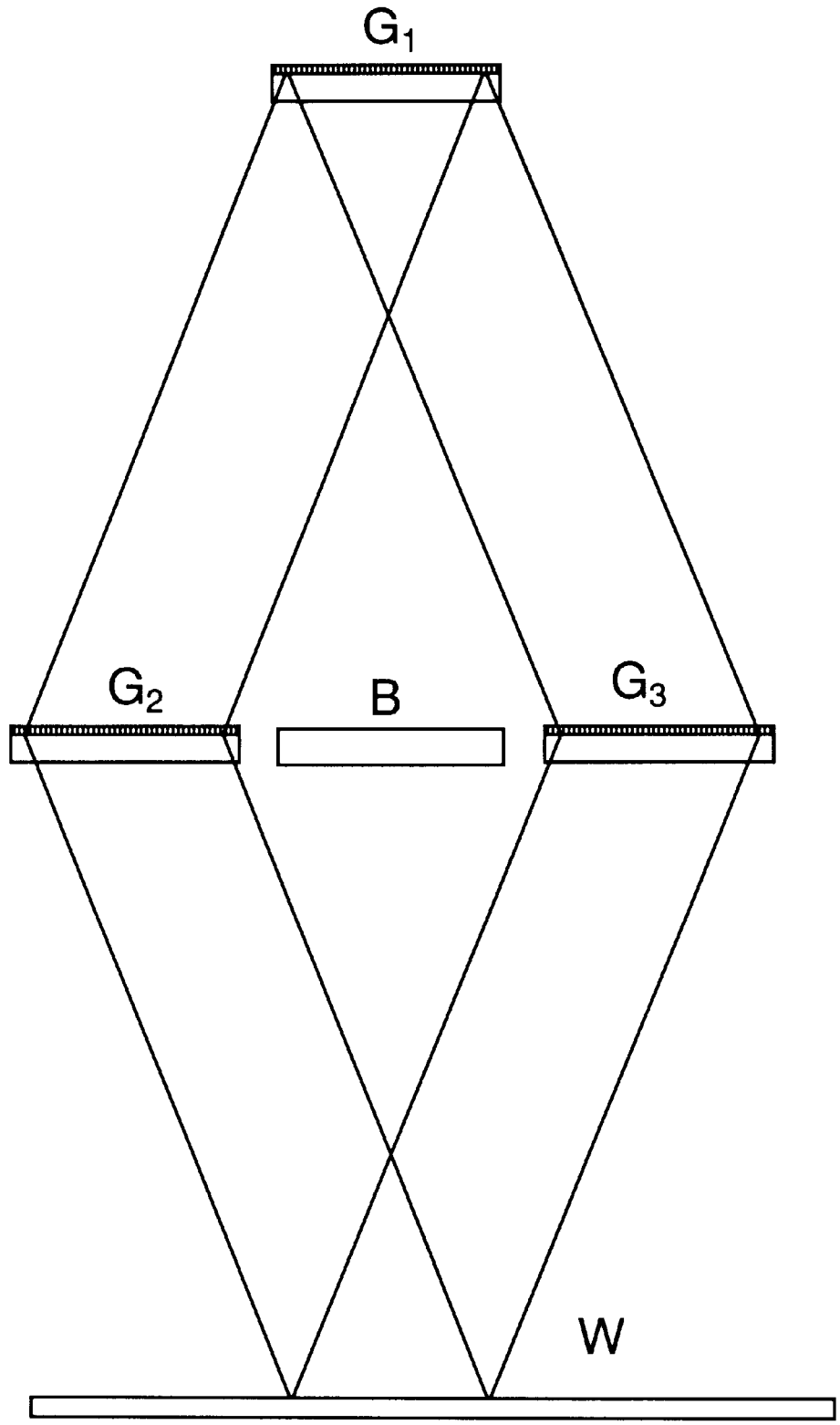
FIG. 14 illustrates an achromatic interference method where multiple gratings having the same pitch are used to write U filter elements having the same pitch. Exposures are limited by blocking the first and second order diffracted rays and optionally by segmenting gratings $G_1$, $G_2$ and $G_3$ rather than making the gratings continuous, and/or by providing a slotted opaque reflective properly supported film adjacent the waveguide. The rays indicate that gratings $G_2$ and $G_3$ focus first order rays transmitted by grating $G_1$ onto the waveguide at angles for matching the waveguide modulation and grating pitch. V=4 separate exposures through similar arrangements, with proper positioning of the waveguide or grating set, are needed to write the mpm filter of Table 1.

Achromatic Interferometric Imprinting. FIG. 14 shows another arrangement requiring V exposures through separate offset grating sets, based on a method called "achromatic interferometric lithography" (Savas et al, "Large-Area Achromatic Interferometric Lithography for 100 nm Period Gratings and Grids," J Vac Sci Tech, B 14(6), pp 4167–70 (1996)). FIG. 14 shows one of V beam forming grating sets including three gratings $G_1(v), G_2(v), G_3(v)$ having the same pitch, and opaque element B to block transmission of the zero order. The gratings may be continuous or segmented as in FIG. 11b, that is, one or more gratings of a set may have U grating elements of length greater than or about $s_v$ separated by opaque mirrored regions of length $L_R-s_v$. The three gratings of a set are arranged so that the first order light transmitted by GI will form the image of $G_1$ at the waveguide. The grating spacing and diffraction angles in FIG. 14 correspond to those needed to imprint the $s_1$ segments of Table 1. Only the first order rays reach gratings $G_2$ and $G_3$ and only the desired orders intercept the section of waveguide to be imprinted. An element adjacent the waveguide may be added with slits in an opaque reflective surface to limit imprinting to an intended section of waveguide. This achromatic interferometric arrangement reduces the coherence length requirement for a laser and provides for rastering an incident laser beam over grating $G_1$ to average out spatial and temporal variations in intensity, thereby improving prospects for accurately and uniformly developing the desired average index and modulation amplitude in a waveguide. Successive exposures through V offset arrangements following appropriate translational or angular displacements of the waveguide or grating array are required to produce the desired mpm.

Angularly Offset Fixtures Providing Optional Single Exposure. All of the arrangements illustrated in FIGS. 11a, 11b, 12a, 12b, 14 provide rays converging toward a waveguide. All of the U or V beam forming elements as depicted in those figures can be arranged as a set which can be translated or rotated to permit exposing a waveguide in successive steps that will accomplish mpm. Beam forming elements may also be fabricated and assembled to be used by rotating the assembly through prescribed angles between exposures using a fixed laser beam or as a fixed arrangement with multiple incident laser beams. The latter is illustrated by FIGS. 15a–d.

Figure 15A:
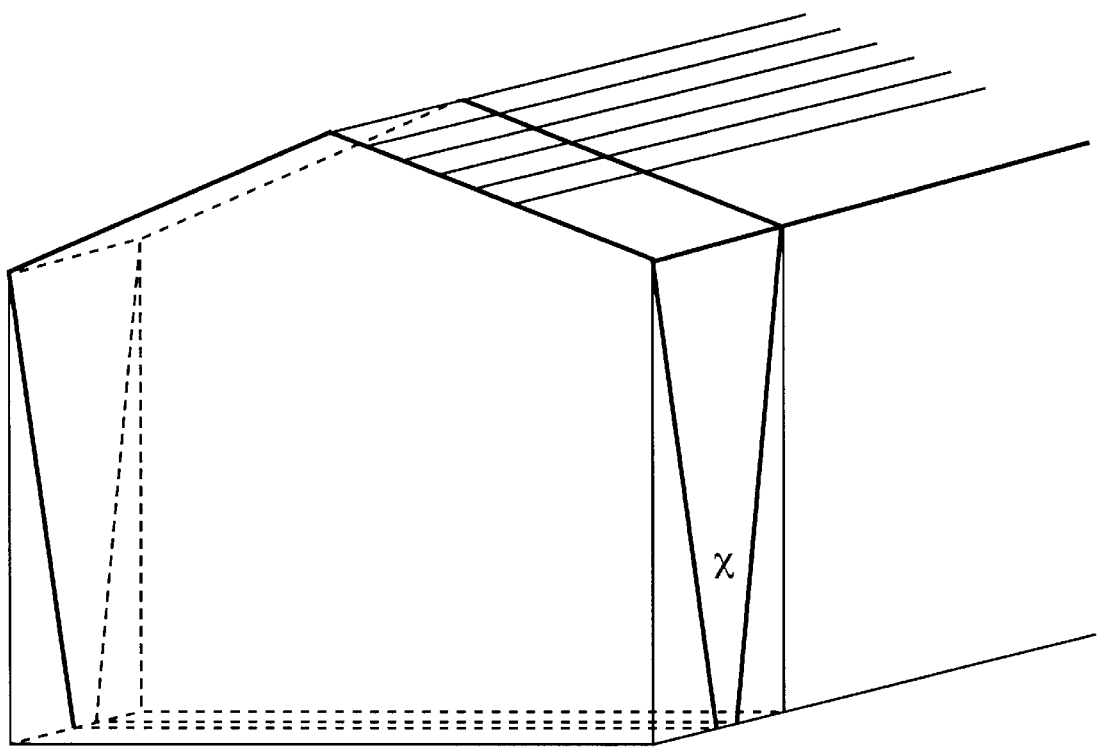
FIGS. 15a, b, c and d illustrate means by which a multiply periodic filter can be developed in a cylindrical fiber by a single exposure involving multiple incident beams.
Figure 15B:
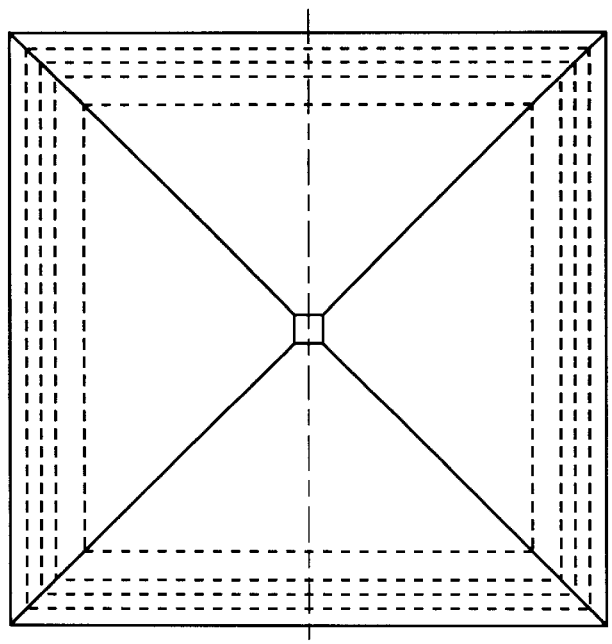
Figure 15C:
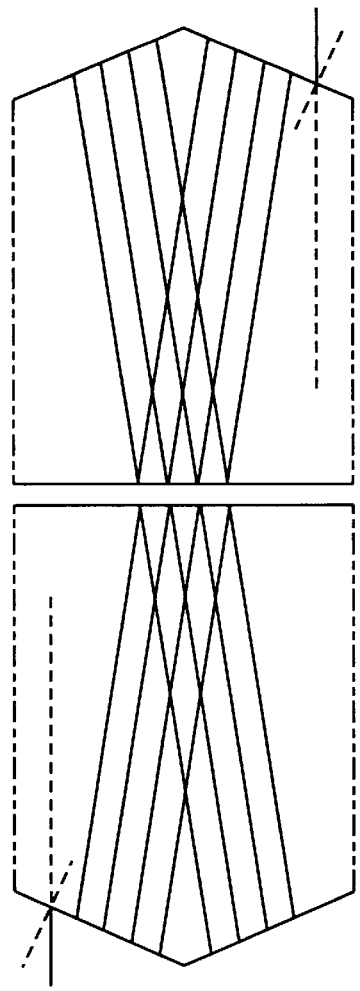
Figure 15D:
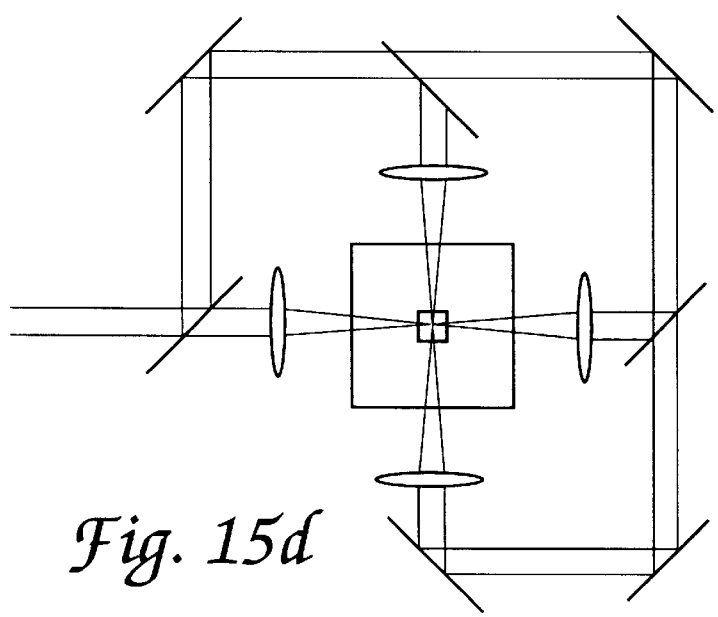
Figure 16A:
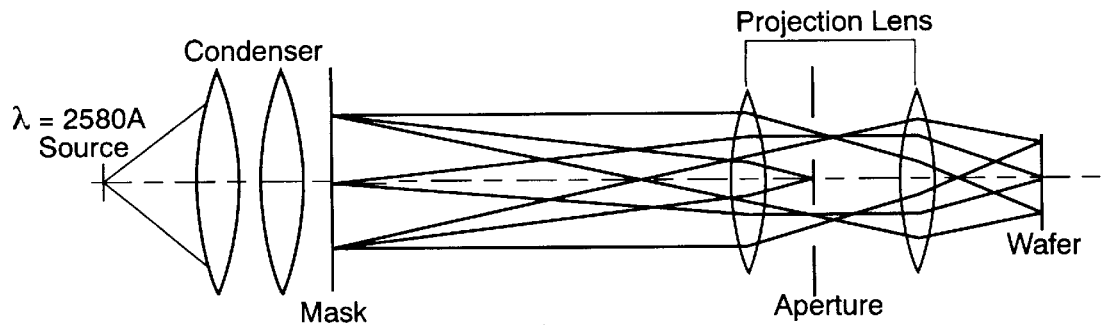
FIGS. 16a, b, c and d illustrate the spatial frequency doubling photolithographic method of modulating a waveguide, after Jewell and White, as presented by Henry et al.
Figure 16B:
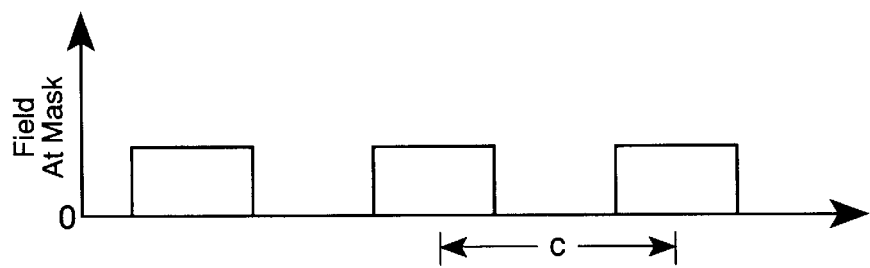
Figure 16C:
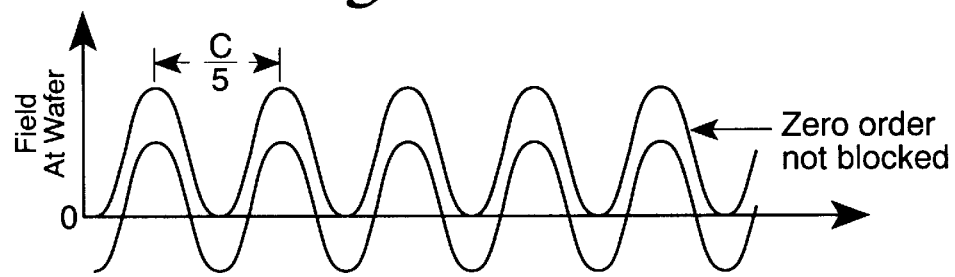
Figure 16D:
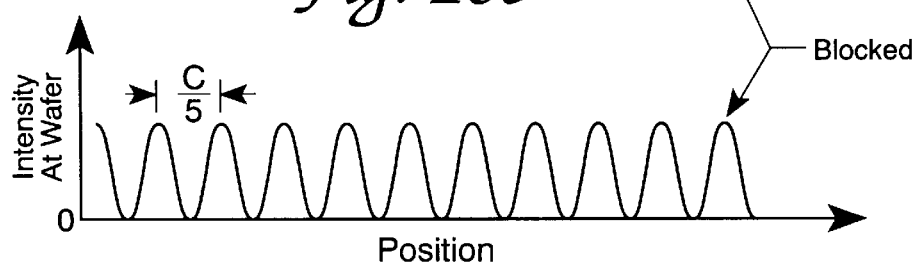

FIG. 15a shows how U segments, indicated by heavy lines, might be cut from the nominally faceted but actually curved faced prism, shown in cross section in FIG. 12a, and joined with a suitable angular and length offset so that light rays incident on the facets are focused within and converge to the apex of the angle $\chi$, thus providing crossed rays at the intended locations on the waveguide. The prism parts are arranged (FIGS. 15b,c,d) so that slots with different u lie in different planes, each plane paralleling the fiber axis. The curing light is incident on the fiber from various directions through slots in the surfaces. An intersection between the planes containing the slits and a plane perpendicular forms a regular polygon, a square in particular in FIGS. 15b,c,d. Such an assembly, suitable for imprinting the filter described by Table 1, with the modification that U=V=4, is shown in cross section in FIG. 15b, c and d. The four prism parts are joined with the slits $S_{u,v}$ facing the opening into which a fiber would be drawn to be exposed during a single event and thus index modulated. The corresponding parts of neighboring slits having a common v in each facet would be offset by a distance $L_R$. The dot-dash line through the cut in FIG. 15b represents the position of the cut represented by FIG. 15c. FIG. 15c shows the position of rays, incident on slots, within two prisms of the assembly which would write half of the U×V=4×4=16 segments su,v FIG. 15d shows how the assembly as presented in FIG. 15b and 15c is located in a optical setup so that light could be suitably incident simultaneously on the facets of the assembly. A beam incident from the left is divided and or reflected multiple times by beam splitters and mirrors to provide beams of equal intensity incident on each prism facet such that refracted light passes through the appropriate slits and converges on the axis of the optical waveguide to be modulated. Cylindrical lenses are included to focus the light onto the fiber core. The most critical factors in the implementation of this approach are beam uniformity and providing a precise offset distance $L_R$ between the adjacent slots $S_{u,v}$ in all of the adjacent sectors of the device.

Development of an accurate complex arrangement as shown in FIGS. 15a–d with U or V sectors may be difficult, as would the provision of U beams with equal and uniform intensity incident from U directions. The advantage of the arrangement relative to the simple devices of FIGS. 11a, 11b,12a,12b and 13 is that the setup can be fixed once adjusted except that fibers to be modulated must be centered on the symmetry axis of the setup. Note that the cylindrical focusing lenses and beam forming sectors can be selected such that the angles $\chi=(360°-\psi)/U$, so that the structure is not necessarily closed. This would permit the fiber to be inserted from an open sector spanning the angle $\psi$.

The processes just described, whether prism facets or phase gratings are used to project crossed beams through slots, or whether gratings are placed immediately adjacent a waveguide or fiber, are expected to write filters with some variation from the desired modulation at the boundary between adjacent elements. Examples are slanted modulation associated with crossed first order diffraction from neighboring elements in a multiply periodic phase mask and apodization of modulation and/or overlap of modulation that may occur as a result of writing in multiple steps through slots separated as exemplified in FIGS. 11a through 13 or by segmented gratings as illustrated in FIG. 11b and FIG. 14. The main concern is providing accurate standing wave periods with uniform contrast and providing translations or offsets $L_R$ that are accurate and correctly relate to the actual $d_v$, $s_v$ and local average index $n_{a,v}$ or more generally $n(u,v)$ that develops within the filter. The objective is to provide for coherent coupling of the reflections from almost all parts of like filter elements at the wavenumbers $y_m=y_v$ where m indicates the reflection order of a reflection peak and v refers to a filter element having a period $d_v$ with a first order peak reflection at $y_v$. Commensurate optical element lengths $s_v=n_a s_v$ are assumed here. The desired characteristics of other comb peaks, $y_v$, m will tend to conform to theory if the desired phase coherence is achieved for reflection peaks $y_m=y_v$ from similar elements.

In the examples shown in Tables 1–3, the number of periods $M_v$ of length $d_v$ in the filter elements $f_{u,v}$ range from about 200 to about 500, and in each case the adjacent $M_v$ are different by 1. Since the $M_v$ for adjacent filter elements are different by 1, the corresponding phase grating with $\Lambda=2d_v$ cannot have exactly an integral number of periods corresponding to the length $s_v$. Clearly, where a single phase mask is designed to form an entire filter without being moved, some form of blending or incompleteness of grating periods at the junction between grating elements must be expected. The main requirement is that the grating be multiply periodic so that the diffraction pattern created will be multiply periodic, then with uniform illumination the grating will produce mpm in the waveguide. The exposures must be controlled to provide the correct average index in order that the filter elements reflections be substantially in phase at the filter boundary when guided light of a designated comb wavenumber is incident on the filter. Monitoring of reflection spectra during exposure is a possibility for silica fiber guides.

In cases where multiply periodic filters are prepared using phase masks located remotely from the waveguide as illustrated in FIGS. 11b, 12b, 14 and 15, the grating elements may be somewhat longer than the slot lengths $S_v$ and filter elements $s_v$. If the grating elements are coherently related and if the incident laser light coherence length exceeds the separation of all elements having the same pitch, disregarding all other possible imperfections, the modulation produced in a waveguide should be multiply periodic.

The crossed beam imprinting processes would involve some trial and error tailoring to achieve a desired set of comb-like reflections. The primary consideration is to develop a filter in which most of the cycles of length $d_v$ provide in-phase reflections at the wavenumber $y_v$. This will ensure that the filter will provide the anticipated reflection peaks $y_m$ in the band of interest. Phase masks of the type discussed above can be produced with accuracy sufficient for producing centimeter long multiply periodic waveguide modulation (see QPS Technology, supra). Control of exposures should be sufficient to produce a uniform target average index so that a predicted comb structure is produced in a selected waveguide material.

Projection Imprinting Methods. Mpm may also be produced by projection methods wherein the image of a multiply periodic photomask is projected onto a holographic or photolithographic material which is then processed, if necessary, to develop the desired modulation. Magnification for such systems can vary from unity to some fraction such as ⅕ or ⅒. The traditional method requires the image plane to lie fully within the lens field. An alternative is "step and scan technology" (DeJule, "Lithography: 0.18 μm and Beyond," Semiconductor International, pp 54–60 (February 1998)), which has been implemented in most DUV lithography systems.

A relevant imaging method which relates specifically to periodic masks is called "spatial frequency doubling photolithography" (see Presby, Ed, supra, p 117), depicted in FIG. 16 (after Henry et al, supra). This system includes a field mask which blocks the zero diffraction order and second order, when the diffraction angles are small, since $\theta_2 \approx 2\theta_1$, so that the pattern imprinted on the waveguide is that from crossed first order rays which originate from the same part of the photomask. This system has advantages similar to those indicated in the discussion of FIG. 14.

The optical setup can vary from that shown in FIG. 16a–d. The primary requirement is that the field mask be scaled and placed to intercept the unwanted rays and that the grating be imaged at the waveguide. Advantages of imaging systems like those discussed here include that the concern with laser coherence length is eliminated and that periodic filters requiring $s_v$ of the order or less than a fiber cladding thickness can be printed without being dominated by slanted modulation.

A complication of spatial frequency doubling photolithography is that the field mask needs to transmit first order rays originating at different grating elements and block wanted rays. Since $\theta_{1,v}$ and $\theta_{2,v}$, v=1–V, will range about some mean value, the function of an aperture mask and the sharp focus distance for the element with different v will be compromised. Comb peak broading will result from such compromises, but useful comb filters can be produced by these methods.

Malo et al, supra, describe point-by-point writing of "micro Bragg gratings" with periods of about one micron and lengths of a few hundred microns, by imaging a 15 micron slit on a waveguide core. The process was automated; the fiber was translated in micron sized steps between pulses each of which produced a damage spot at the core boundary. This kind of process might be used before applying cladding to a fiber. The gratings reflected 1.5 micron light in second or third order. A similar approach could be employed for mpm or step-wise-constant type HTC filters.

Among other things, the details would depend on the resolution of the writing system; the modulation periods may satisfy, $y=m'/2n_a d_v$ where m' is 1, 2 or 3.

An advantage of projection methods is ease of arranging for uniform lighting of the grating and of developing constant waveguide modulation amplitude and average index. Perhaps the most important advantage of projection imaging to produce mpm is that commercial systems are available and can be used in a practiced manner if the photomask is made available.

Particle Beam Means of Developing mpm Gratings and mpm Waveguides. A charged particle beam or x-ray method is essential to form a grating or photomask for imprinting using the above methods. The rastered particle beams may be used to write mpm in waveguides directly, which may be practical if mpm is used as one of several integrated devices on a planar waveguide.

Fiber Optics Sensor Systems. Sensors based on fiber optics and multiplexed links between sensors and monitoring or control stations may use mpm. Range of materials, optical wavelength, and parameters for HTC filters that might be used is large for such sensor systems. The most obvious use is m/d.

The filter design examples discussed here are one centimeter length filters which address relatively dense m/d; effective coherent mpm filters of this length may be difficult to produce initially; there are other applications where more easily produced moderate to low density m/d utilizing cascade architecture based on HTC mpm comb filters will be useful.

The entire teachings of all references cited herein are incorporated by reference herein.

The invention therefore provides novel high transmission comb-like filters in waveguiding media and methods for imprinting or inducing the required index modulation patterns in the media. It is understood that modifications to the invention may be made as might occur to one skilled in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A filter structure comprising a wave guiding medium containing multiple periodic refractive index modulation patterns contained within or adjacent to a linear or planar optical waveguide, for producing one or more substantially equally spaced comb-like reflection peaks from an incident guided wave having a wavelength band width at least three times the spacing of adjacent said reflection peaks, wherein the peak half maximum widths are less than one half the peak spacing and each said pattern has an optical length $d(v)$ equal to $n(u,v)d(u,v)$, where $n(u,v)$ is the local average real part of the optical refractive index of said medium and $d(u,v)$ is a local periodic physical length, each of said patterns being a series of filter elements, $$f(1,1),f(1,2),\ldots,f(1,2),\ldots f(1,v),f(2,1),f(2,2),\ldots f(2,v),\ldots$$
$$f(2,V),\ldots f(u,1)\ldots f(U-1,V)f(U,1)\ldots f(U,V)$$

with modulation amplitudes $\Delta(u,v)$ wherein U and V are preselected integers not less than 2, and u=1 to U and v=1 to V in said series, the number of periodic physical lengths $d(u,v)$ or optical lengths $d(u,v)$ in a filter element $f(u,v)$ is designated by $M(u,v)$, and wherein the physical length of an element $f(u,v)$ is designated as $M(u,v)d(v)=s(u,v)$ and the optical length is $n(u,v)s(u,v)=s(u,v)$, and wherein the physical length of adjacent elements having a common v designator is designated by $L(u,v)$, and wherein the peak reflectance provided by any filter element $f(u,v)$ of length $s(u,v)$ is not greater than 70% and the length of filter elements, $s(u,v)$ and the length $L(u,v)$ are selected to provide a high degree of coherence for reflections at the entrance end of said filter structure from elements having equal v.

2. The filter structure of claim 1 wherein V=2 and $d(u,v)=s(u,v)$ defining a singularly periodic rectangular modulation wherein the ratio of a long segment length thereof to a short segment length thereof $d(2)/d(1)$ is at least five.

3. The filter structure of claim 1 wherein $n(u,v)$ is a constant.

4. The filter structure of claim 1 wherein $M(u,v)$ is an integer.

5. The filter structure of claim 1 further comprising at least one supplemental periodic modulation having a period $d(v)$ or $d(v)$ superimposed along the total length of said filter structure.

6. The filter structure of claim 1 wherein $s(u,v)$ have a length $s(v)$ for all u and all $L(u,v)$ have the same value.

7. The filter structure of claim 1 wherein $s(u,v)$ or $s(u,v)$ have a constant length.

8. The filter structure of claim 1 further comprising a single mode linear or planar waveguide for containing said waveguiding medium.

9. The filter structure of claim 1 wherein $d(u,v)$ are equal to $d(v)$, whereby all elements designated by v have the same minor period physical length.

10. The filter structure of claim 9 wherein said wave guiding medium is a dielectric material.

11. The filter structure of claim 10 wherein said wave guiding medium is selected from the group consisting of glass, silica glass fiber containing germanium and hydrogen, germania glass, rare earth doped silica glass, Fe doped $LiNbO_3$, $SrBaNbO_3$, ZnO, GaAs/GaAlAs, photopolymers, polymer dispersed liquid crystals and polymer stabilized liquid crystals.

12. The filter structure of claim 1 further comprising means for tuning said filter structure.

13. An optical cavity structure comprising:
(a) first and second optical filter structures, each said filter structure comprising a wave guiding medium containing multiple periodic refractive index modulation patterns contained within or adjacent to a linear or planar optical waveguide, for producing one or more substantially equally spaced comb-like reflection peaks from an incident guided wave having a wavelength band width at least three times the spacing of adjacent said reflection peaks, wherein the peak half maximum widths are less than one half the peak spacing and each said pattern has an optical length $d(v)$ equal to $n(u,v)$ $d(u,v)$, where $n(u,v)$ is the local average real part of the optical refractive index of said medium and $d(u,v)$ is a local periodic physical length, each of said patterns being a series of filter elements, $$f(1,1),f(1,2),\ldots,f(1,v),\ldots f(1,V),f(2,1),f(2,2),\ldots f(2,v),\ldots$$
$$f(2,V),\ldots f(u,1)\ldots f(U-1,V)f(U,1)\ldots f(U,V)$$

wherein U and V are preselected integers not less than 2, and u=1 to U and v=1 to V in said series, the number of periodic physical lengths $d(u,v)$ or optical lengths $d(u,v)$ in a filter element $f(u,v)$ is designated by $M(u,v)$, and wherein the physical length of an element $f(u,v)$ is designated as $M(u,v)d(v)=s(u,v)$ and the optical length is $n(u,v)s(u,v)=s(u,v)$, and wherein the physical length of adjacent elements having a common v designator is designated by $L(u,v)$, and wherein the peak reflectance provided by any filter element $f(u,v)$ of length $s(u,v)$ is not greater than 70% and the length of filter elements, $s(u,v)$ and the length $L(u,v)$ are selected to provide a high degree of coherence for reflections at the entrance end of said filter structure from elements having equal v;

(b) an unmodulated waveguide disposed between said first and second optical filter structures;

(c) first and second cavity mirrors, said first and second filter structures and said waveguide disposed between said mirrors and defining an resonant optical cavity between said mirrors; and (d) means for tuning at least one of said first and second mirrors.

14. The optical cavity structure of claim 13 wherein said wave guiding medium is a dielectric material.

15. The optical cavity structure of claim 14 wherein said wave guiding medium is selected from the group consisting of glass, silica glass fiber containing germanium and hydrogen, germania glass, rare earth doped silica glass, Fe doped $LiNbO_3$, $SrBaNbO_3$, ZnO, GaAs/GaAlAs, photopolymers, polymer dispersed liquid crystals and polymer stabilized liquid crystals.

* * * * *